United States Patent
Matsui

[19]

[11] Patent Number: 5,909,319
[45] Date of Patent: Jun. 1, 1999

[54] LONG FOCAL LENGTH MACROLENS SYSTEM

[75] Inventor: Sei Matsui, Chiba, Japan

[73] Assignee: Nikon Corporation, Tokyo, Japan

[21] Appl. No.: 08/940,903

[22] Filed: Sep. 30, 1997

[30] Foreign Application Priority Data

Sep. 30, 1996 [JP] Japan .................................... 8-278728

[51] Int. Cl.⁶ .................................................. G02B 15/22
[52] U.S. Cl. .......................................... 359/693; 359/688
[58] Field of Search ............................... 359/688, 693, 359/750

[56] References Cited

U.S. PATENT DOCUMENTS

| | | | |
|---|---|---|---|
| 3,817,600 | 6/1974 | Watanabe et al. | 359/693 |
| 4,145,115 | 3/1979 | Betensky | 359/683 |
| 4,448,495 | 5/1984 | Hayashi | 359/693 |
| 5,191,475 | 3/1993 | Terasawa et al. | 359/693 |

*Primary Examiner*—Georgia Epps
*Assistant Examiner*—Dawn-Marie Bey
*Attorney, Agent, or Firm*—Michael N. Meller

[57] ABSTRACT

A high-performance, long-focal length macrolens system is provided which is easy-to-operate and is capable of photographing an object at an infinitely far distance and an object at a close distance without changing the overall length of the macrolens system. The system is configured in order from the object side, having:

a first lens group G1, which includes a negative lens and has a positive overall refractive power, a second lens group G2, which includes a compound lens and has a negative overall refractive power, a third lens group G3, which includes a compound lens and has a negative overall refractive power, and a fourth lens group G4, which has a positive refractive power, and the system fulfills at least three preselected conditions.

14 Claims, 16 Drawing Sheets

LONG FOCAL LENGTH MACROLENS SYSTEM

BACKGROUND OF THE INVENTION

The present invention relates to a macrolens system. More particularly, the present invention relates to a macrolens system having a long focal length. More specifically, it relates to a macrolens system which can photograph an object from an infinitely far distance to a close distance without substantially changing its overall length.

In photographing an object which has a magnification of about 1×, it is well known to use a technique of moving the focusing lens group using a bellows. However, it is difficult to operate a bellows and it is not compact. Such method also decreases image quality at a short taking distance significantly, providing poor imaging performance.

In recent years, along with the popularity of the auto focus (AF) camera, demands have been made that the amount of work be reduced; that is the work is defined as the weight of a focusing lens group multiplied by the amount of movement. There are some proposals which work with auto focusing operations and, at the same time, prevent the focusing lens group from deteriorating its imaging performance by working on the focusing method in various ways.

Particularly, in a macrolens system which has a long focal length, the amount which the focusing lens group moves from focusing on an infinitely far object to focusing on a close object tends to be undesirably large. Therefore, an optical system having a configuration which does not impede the AF operation and the method of focusing needs to be developed. Such a macrolens system, which is able to photograph an object at an infinitely far distance and also photograph an object at a close distance, such as at 1× is disclosed for example in Japanese Patent Publication No. S62-42252 and Japanese Laid-Open Patent Aplication No. H2-81014, S55-140810, S61-132916 and H5-32319.

Also, in Japanese Patent Publication No. S55-78326, H5-42643, and H 6-46259, etc., for example, is disclosed a "long focal length lens system" in which the distance between the end of the lens closest to the object and the image plane of the lens system, that is the overall length, does not change. However, the long focal length lens disclosed in these patent publications is able to photograph at ⅐×, ⅒×, and ¼× only. This does not fully achieve the desirable functions of a long focal length macrolens system.

In the long focal length macrolens system disclosed in Japanese Patent Publication No. S62-42252, the first lens group is fixed. This patent publication is assigned to the same assignee as the present invention. This arrangement provides an attractive advantage that the overall length of the system does not change. However the astigmatism fluctuates greatly along with the change in focal length from infinitely far distances to 1×. Also, a great degree of aberration is generated at a mid-range objective focal length state.

In the same manner, in the long focal length macrolens system disclosed in Japanese Laid-Open Patent Application H2-81014 by the same assignee as this invention, almost all of the problems S62-42252 had are resolved including the fact that the overall length of the macrolens system does not change. However, the overall macrolens system is long. Its spherical aberration fluctuates and its distortion at the 1× focal state is undesirably large.

On the other hand, in the long focal length macrolens system disclosed in Japanese Laid-Open Patent Publication No. S55-140810, the change of total length is large, and the work of the focusing lens group is large. The fluctuation of spherical aberration is unfavorably large as well.

In the long focal length macrolens system disclosed in Japanese Laid-Open Patent Publication No. S61-132916, the aberration fluctuation along with the change in the object distance is small. However, the number of lenses which constitute this system is large. This system also moves the first lens group which is heavy and bulky. This increases the overall length during focusing from infinitely far to a near distance. The center of gravity of the lens system moves a large distance and the amount of work used in moving the focusing lens group is unfavorably large.

Also, in the long focal length macrolens system disclosed in Japanese Laid-Open Patent Publication No. H5-323191 by the same assignee as the present invention, the large amount of movement of the center of gravity of the lens system due to the change in objective distance can be suppressed. The aberration fluctuation is best suppressed, of all the above related arts. However the first lens group is moved in this technique, thus poorly suppressing the spherical aberration.

The long focal length macrolens system disclosed in Japanese Laid-Open Publication No. H5-323191 resolved some problems such as:

a fluctuation of astigmatism and overcompensation of the spherical aberration. These problems were corrected by moving the first lens group to the object-side. However, moving the first lens group, which is the bulkiest, is undesirable regardless of the amount of movement, in terms of operability and manufacturability. In other words, if the first lens group is fixed and yet the overall aberration can be balanced, an easy-to-operate, easy-to-manufacture, long focal length macrolens system of consistent quality can be obtained for reduced cost.

SUMMARY OF THE INVENTION

Accordingly, it is an object of the present invention to overcome the problems presented by previous solutions.

A further object of the present invention is to provide a highperformance, long focal length macrolens system which is easy-to-operate and able to photograph an object at an infinitely far distance as well as an object at a close distance.

In a preferred embodiment of the present invention, a long focal length macrolens system is provided which includes, in order from the object-side:

a first lens group G1, having a negative lens and a positive overall refractive power, a second lens group G2, having a compound lens and a negative overall refractive power, a third lens group G3, having a compound lens and a negative overall refractive power, and a fourth lens group G4, having a positive refractive power, wherein the following conditions (1) through (3) are fulfilled:

$$-5 < f2/f1 < -2 \qquad (1)$$

$$2.5 < f2/f3 < 7.5 \qquad (2)$$

$$1 < f4/f1 < 2 \qquad (3)$$

where f1 is the focal length of the first lens group G1, f2 is the focal length of the second lens group G2, f3 is the focal length of the third lens group G3, and f4 is the focal length of the fourth lens group G4.

In other preferred embodiments of the present invention, during focusing on an object at an infinitely far distance to an object at a close distance, the first lens group G1 is fixed, and the second lens group G2 and the third lens group G3 move toward the image-side of the system. In this case, when focusing on an object at an infinitely far distance to an object at a close distance, it is preferable that the distance between the second lens group G2 and the third lens group G3 be maximized at the mid-range objective focal state between the infinitely far objective focal state and the near objective focal state.

In still another object of the present invention, the following conditions (4) and (5) are fulfilled:

$$-0.1 < D3/f3 < -0.15 \quad (4)$$

$$0.8 < D2/D3 < 1.2 \quad (5)$$

where f3 is the focal length of the third lens group G3,

D2 is the distance between the frontmost surface of the second lens group G2 and the rearmost surface of the second lens group G2, and D3 is the distance between the frontmost surface of the third lens group G3 and the rearmost surface of the third lens group G3.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
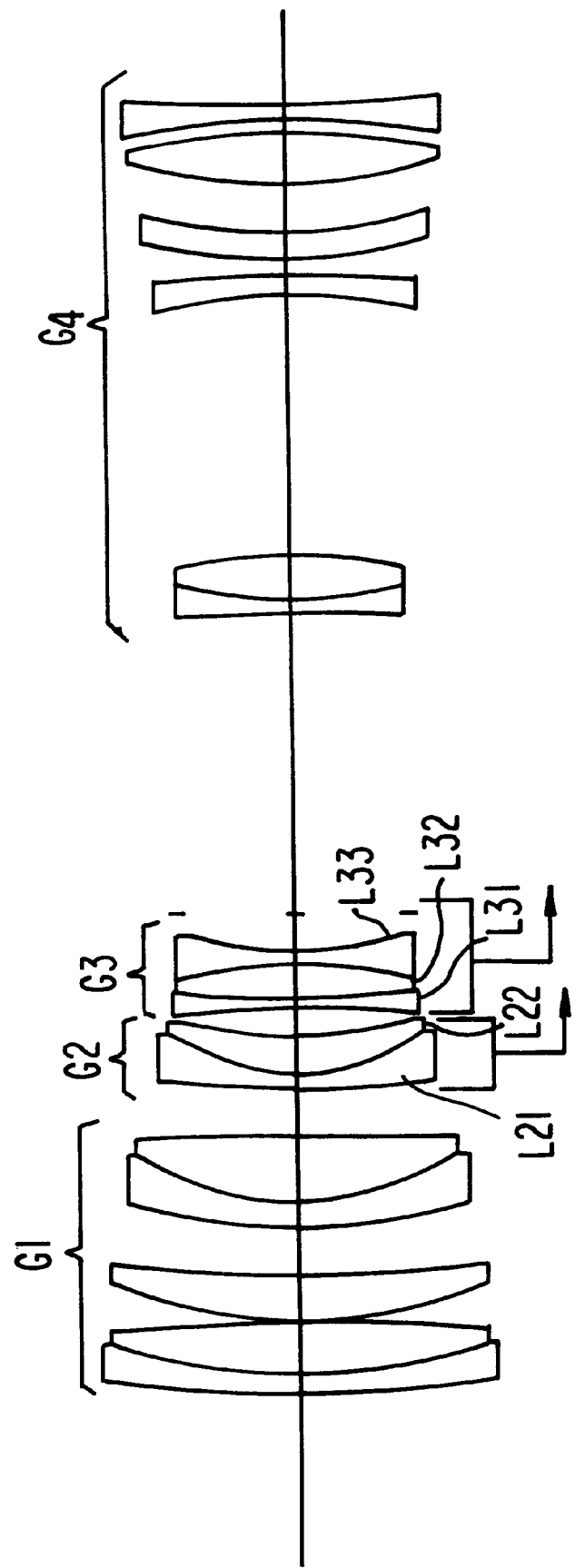
FIG. 1 diagram showing the lens layout of Embodiment 1 of the long focal length macrolens system incorporating the principles of the present invention.

The present inventor recognized the above problems and invented a long focal length macrolens system of high-imaging performance which covers photographing of an object at an infinitely far distance to photographing an object at a close distance by fixing the first lens group for correcting aberrations In the apparatus incorporating the principles of the present invention, during focusing on an object at an infinitely far distance to an object at a close distance, the first lens group G1 is fixed, and the second lens group G2 and the third lens group G3 are moved toward the image-side. Then, the second lens group G2 and the third lens group G3 are moved such that the distance from the first lens group G1 increases. In this way, even if the distance to the object is changed, the overall length of the macrolens system does not change. In this case, it is desirable that the distance between the second lens group G2 and the third lens group G3 be maximized at the mid-range objective focal state.

It should be appreciated that the infinitely far objective state of the system corresponds to the state when the lens system is focused on an object at an infinitely far distance. The near objective state corresponds to the state when the lens system is focused on an object at a close distance such as at a magnification of 1×. The mid-range objective focal state, as the name implies, corresponds to the state when the lens system is focused on an object midway between the infinitely far objective state and the near objective state.

Each of the conditions of the apparatus incorporating the principles of the present invention will be described in detail herein.

The apparatus incorporating the principles of the present invention fulfills the following conditions (1) through (3):

$$-5 < f2/f1 < -2 \quad (1)$$

$$2.5 < f2/f3 < 7.5 \quad (2)$$

$$1 < f4/f1 < 2 \quad (2)$$

where f1 is the focal length of a first lens group G1, f2 is the focal length of a second lens group G2, f3 is the focal length of a third lens group G3, and f4 is the focal length of a fourth lens group G4.

The condition (1) expression defines an appropriate range for the ratio of the focal length of the second lens group G2 to the focal length of the first lens group G1.

If the upper limit of condition (1) is exceeded, the refractive power of the first lens group G1 becomes relatively smaller than that of the second lens group G2. This makes correcting spherical aberration, etc. easier but increases the overall size of the lens system.

Conversely, if the lower limit of condition (1) is exceeded, the refractive power of the first lens group G1 becomes relatively larger than that of the second lens group G2. This makes spherical aberration correction difficult.

The condition (2) expression defines an appropriate range for the ratio of the focal length of the second lens group G2 to the focal length of the third lens group G3.

If the upper limit of condition (2) is exceeded, the refractive power of the third lens group G3 becomes relatively smaller than that of the second lens group G2. This makes spherical aberration correction, etc., difficult.

Conversely, if the lower limit of condition (2) is exceeded, the refractive power of the third lens group G3 becomes relatively larger than that of the second lens group G2. This makes coma aberration correction difficult.

The condition (3) expression defines an appropriate range for the ratio of the focal length of the fourth lens group G4 to the focal length of the first lens group G1.

If the upper limit of condition (3) is exceeded, the refractive power of the fourth lens group G4 becomes relatively larger than that of the first lens group G1. This makes it impossible to suppress fluctuations of spherical aberration, astigmatism, and coma aberration, etc.

On the other hand, if the lower limit of condition (3) is exceeded, the refractive power of the fourth lens group G4 becomes far smaller than that of the first lens group G1. This makes the correction of spherical aberration, astigmatism, and coma aberration difficult.

Also, desirably in the apparatus incorporating the principles of the present invention, the following conditions (4) and (5) are fulfilled to further suppress the aberration fluctuation when the objective distance is changed from infinitely far to a near range.

$$-0.1 < D3/f3 < -0.15 \qquad (4)$$

$$0.8 < D2/D3 < 1.2 \qquad (5)$$

where f3 is the focal length of the third lens group G3,

D2 is the distance between the frontmost surface of the second lens group G2 and the rearmost surface of the second leng group G2, and D3 is the distance between the frontmost surface of the thrid lens group G3 and the rearmost surface of the third lens group G3.

Conditions (4) and (5) define an appropriate range for the distance D3 and that of the distance D2.

If the upper limits of the conditions (4) and (5) are exceeded, the distances D3 and D2 become relatively larger, as a result, the rearmost surface of the third lens group G3 contributes just a little to correct spherical aberration and coma aberration.

If the lower limits of the conditions (4) and (5) are exceeded, the distances D3 and D2 become relatively smaller. As a result, configuration of the compound lens of the second lens group G2 and the third lens group G3 becomes unfavorably complex. This makes chromatic aberration correction difficult.

Also, in the apparatus incorporating the principles of the present invention, in order to suppress chromatic aberration when changing the taking distance from an object at an infinitely far distance to an object at a close distance, it is desirable that the compound lens of the second lens group G2 comprises, in order from the object-side, lenses L21 and L22, and the compound lens of the third lens group G3 comprises; in order from the object-side, lenses L31, L32, and L33. It is also desirable that the system fulfills the following conditions (6) through (9):

$$N21 < 1.68 \text{ and } 1.76 < N22 \qquad (6)$$

$$v22 < v21 \qquad (7)$$

$$N33 < 1.68 \text{ and } 1.76 < N31 \text{ and } 1.76 < N32 \qquad (8)$$

$$v32 < v31 < v33 \qquad (9)$$

Or, in the apparatus incorporating the principles of the present invention, in order to suppress the chromatic aberration due to the change in the objective distance from infinitely far to the near distance, it is ideal that the compound lens of the second lens group G2 comprises; in order from the object-side, lenses L21, L22, and L23, and the compound lens of the third lens group G3 comprises, in order from the object-side, lenses L31, L32, and L33. It is desirable that the system also fulfills the following conditions (8) through (11):

$$N33 < 1.68 \text{ and } 1.76 < N31 \text{ and } 1.76 < N32 \qquad (8)$$

$$v32 < v31 < v33 \qquad (9)$$

$$N21 < 1.68 \text{ and } 1.76 < N22 \text{ and } 1.76 < N23 \qquad (10)$$

$$v23 < v22 < v21 \qquad (11)$$

where

N21 is the refractive index with respect to the d-line of lens L21 of the second lens group G2, N22 is the refractive index with respect to the d-line of lens L22 of the second lens group G2, N23 is the refractive index with respect to the d-line of lens L23 of the second lens group G2, N31 is the refractive index with respect to the d-line of lens L31 of the third lens group G3, N32 is the refractive index with respect to the d-line of lens L32 of the third lens group G3, N33 is the refractive index with respect to the d-line of lens L33 of the third lens group G3, v21 is the Abbe number of lens L21 of the second lens group G2, v22 is the Abbe number of lens L22 of the second lens group G2, v23 is the Abbe number of lens L23 of the second lens group G2, v31 is the Abbe number of lens L31 of the third lens group G3, v32 is the Abbe number of lens L32 of the third lens group G3, and v33 is the Abbe number of lens L33 of the third lens group G3.

The above conditions (6) through (11) are meant to suppress chromatic aberration during the change in objective distance from an infinitely far object to a near, real-sized, object. They also define the factors required for selecting an optic material for the compound lens of the second lens group G2 and the compound lens of the third lens group G3.

If conditions (6) through (11) are exceeded by the selected optic material, correcting the chromatic aberrations including chromatic aberration fluctuation, become unfavorably complex.

Each of the embodiments are described herein by referring to the attached FIGS. 1 through 16.

In each of the embodiments, the long focal length macrolens system comprises, in order from the object-side:

a first lens group G1, which has a negative lens and a positive overall refractive power, a second lens group G2, which includes a compound lens, and has a negative overall refractive power.

a third lens group G3, which includes a compound lens, and has a negative overall refractive power, and a fourth lens group G4, which has a positive overall refractive power.

Embodiment 1

FIG. 1 is a diagram showing the lens layout for a long focal length macrolens system of Embodiment 1 of the present invention.

In FIG. 1, the first lens group G1 comprises, in order from the object-side:

a positive compound lens, which is made up of a negative meniscus lens and a biconvex lens, a positive meniscus lens, which has a convex surface facing toward the object-side, and a positive compound lens, which is made up of a negative meniscus lens and a biconvex lens.

A second lens group G2 comprises a negative compound lens, which is made up of, in order from the object-side:

a negative meniscus lens L21, which has a convex surface facing toward the object-side, and a positive meniscus lens L22, which has a convex surface facing toward the object-side.

A third lens group G3 comprises a negative compound lens, which is made up of, in order from the object-side:

a biconcave lens L31, a biconvex lens L32, and a biconcave lens L33.

A fourth lens group G4 comprises, in order from the object-side:

a positive compound lens, which is made up of a negative meniscus lens, which has a convex surface facing toward the object-side, and a biconvex lens, a negative meniscus lens, which has a concave surface facing toward the object-side, a negative meniscus lens, which has a convex surface facing toward the object-side, a biconvex lens, and a biconcave lens.

When the focal state changes from an infinitely far objective state to a near objective state, the first lens group G1 and the fourth lens group G4 are fixed, and the second lens group G2 and the third lens group G3 move toward the image-side (toward the right in FIG. 1).

In other words, the second lens group G2 and the third lens group G3 move such that the distance from the first lens group G1 increases. The overall length of the lens system does not change as the objective distance changes and the distance of the second lens group G2 from the third lens group G3 is maximized at the mid-range objective focal state.

The following Table 1 shows various values obtained in Embodiment 1 of the present invention. In Table 1: f is the focal length; β is the magnification; FN is the F number; 2ω is a field angle; and d0 is an "object distance" (the distance between the frontmost surface of the lens system and the object.

In addition, the number in the left column shows the order of the lens surface counted from the object-side; r is the radius of curvature; d is the surface separation between each of the lenses; and n and ν show the refractive index with respect to the d-line (λ=587.6 nm) and the Abbe number respectively.

TABLE 1 f = 180
FN = 4.0
2ω = 13.7°

|  | r | d | ν | n |
|---|---|---|---|---|
| 1. | 214.868 | 2.25 | 39.6 | 1.80454 |
| 2. | 77.049 | 6.30 | 82.6 | 1.49782 |
| 3. | −182.000 | 0.25 | | |
| 4. | 64.980 | 5.40 | 82.6 | 1.49782 |
| 5. | 293.751 | 5.85 | | |
| 6. | 71.600 | 2.80 | 40.9 | 1.79631 |
| 7. | 35.730 | 7.90 | 65.5 | 1.60300 |
| 8. | −16111.269 | (d8 = variable) | | |
| 9. | 227.315 | 1.80 | 60.3 | 1.62041 |
| 10. | 28.260 | 4.50 | 46.4 | 1.80411 |
| 11. | 59.151 | (d11 = variable) | | |
| 12. | −113.400 | 1.35 | 46.4 | 1.80411 |
| 13. | 125.000 | 3.95 | 28.6 | 1.79504 |
| 14. | −59.400 | 1.55 | 60.0 | 1.64000 |
| 15. | 44.459 | (d15 = variable) | | |
| 16. | 773.484 | 1.80 | 28.3 | 1.72825 |
| 17. | 77.188 | 5.50 | 60.3 | 1.62041 |
| 18. | −53.662 | 31.10 | | |
| 19. | −70.000 | 2.30 | 45.1 | 1.74400 |
| 20. | −296.726 | 2.30 | | |
| 21. | 77.368 | 2.50 | 56.5 | 1.50137 |
| 22. | 49.882 | 6.20 | | |
| 23. | 58.677 | 6.00 | 53.6 | 1.54739 |
| 24. | −87.170 | 1.80 | | |
| 25. | −100.000 | 2.00 | 45.9 | 1.54814 |
| 26. | 506.860 | | | |

Various Separations at Each Focal State

| | Infinitely Far Objective Focal State | Mid-Range Objective Focal State | Near Objective Focal State |
|---|---|---|---|
| f/β | 180.0005 | −0.5000 | −1.0000 |
| d0 | ∞ | 431.7921 | 241.9518 |
| d8 | 6.1280 | 14.5541 | 35.1934 |
| d11 | 3.4536 | 11.8796 | 3.4536 |
| d15 | 40.4919 | 23.6399 | 11.4266 |

Conditional Values (1) f2/f1 = −3.45
(2) f2/f3 = 4.78
(3) f4/f1 = 1.50
(4) D3/f3 = −0.13
(5) D2/D3 = 0.92
(6) N21 = 1.62041, N22 = 1.80411
(7) ν21 = 60.3, ν22 = 46.4
(8) N31 = 1.80411, N32 = 1.79504, N33 = 1.64000
(9) ν31 = 46.4, ν32 = 28.6, ν33 = 60.0

Figure 2:
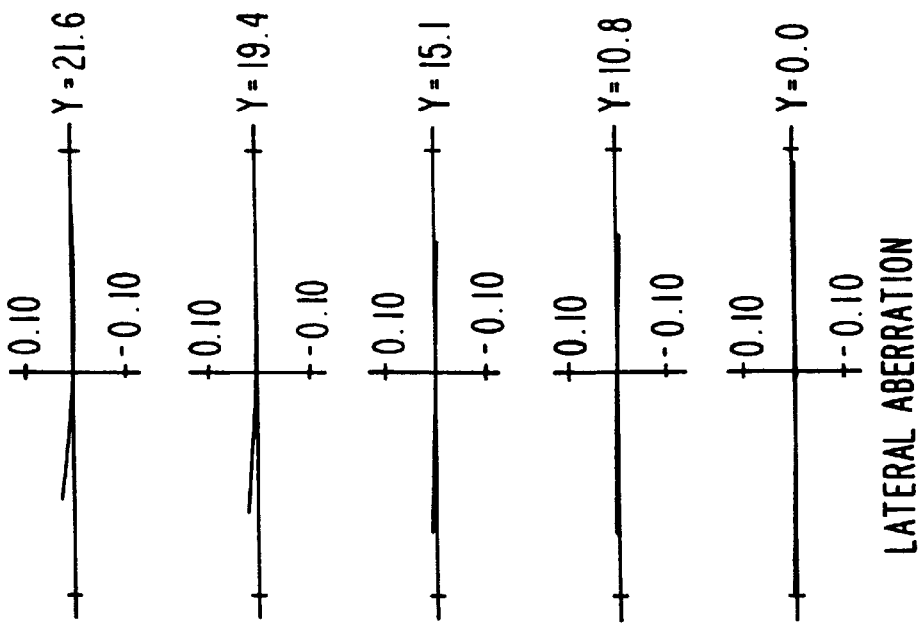
FIG. 2 is diagram showing various aberrations in the infinitely far objective focal state of Embodiment 1.
Figure 2:
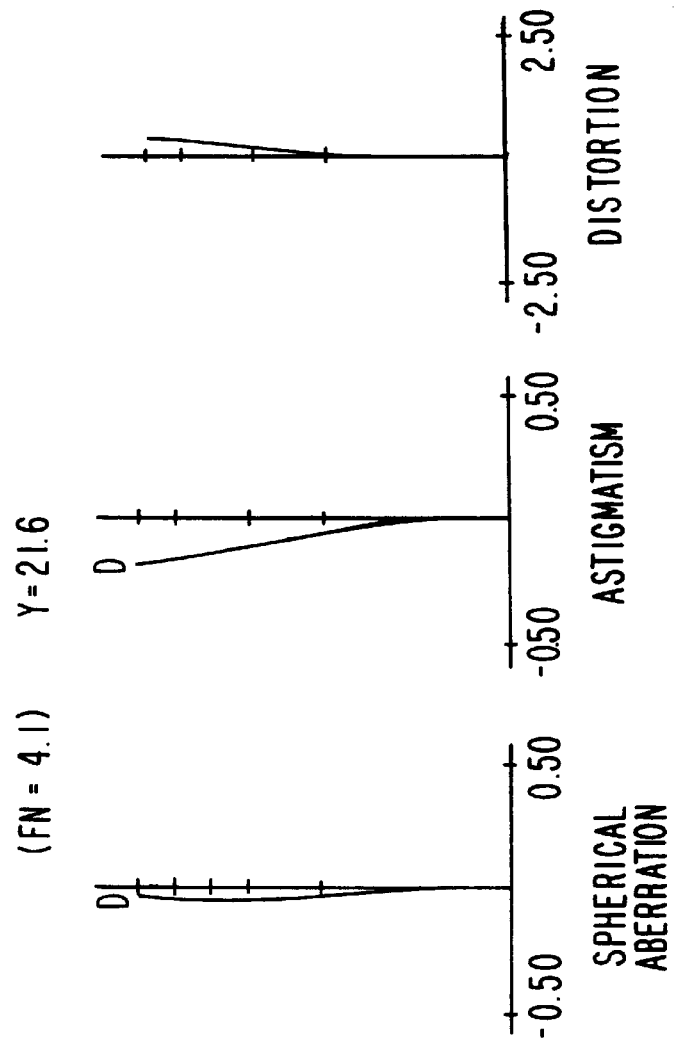
Figure 3:
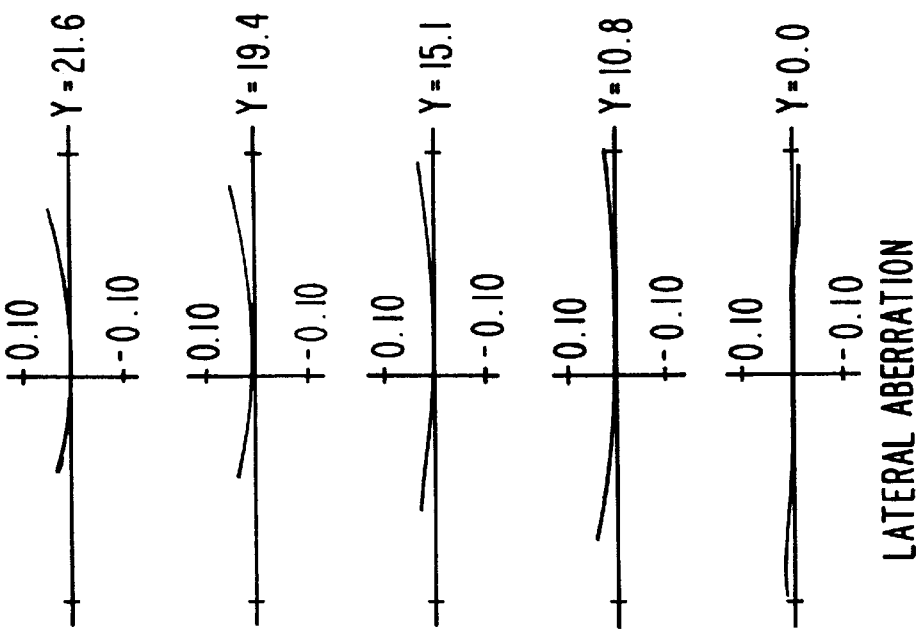
FIG. 3 is a diagram showing various aberrations at the mid-range objective (magnification ½×) focal state of Embodiment 1.
Figure 3:
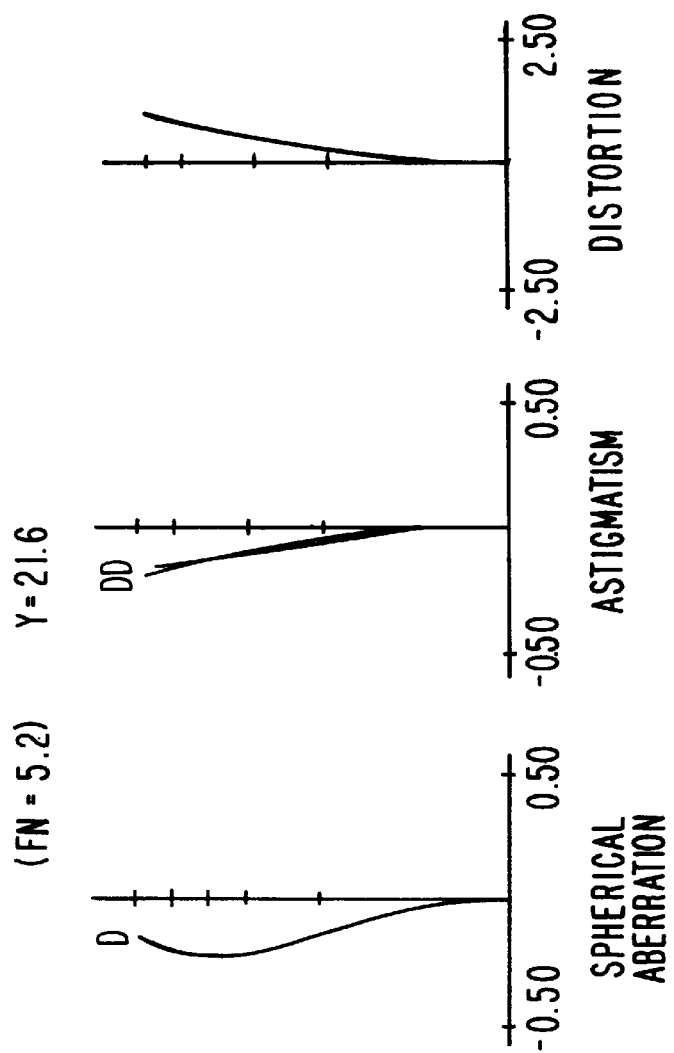
Figure 4:
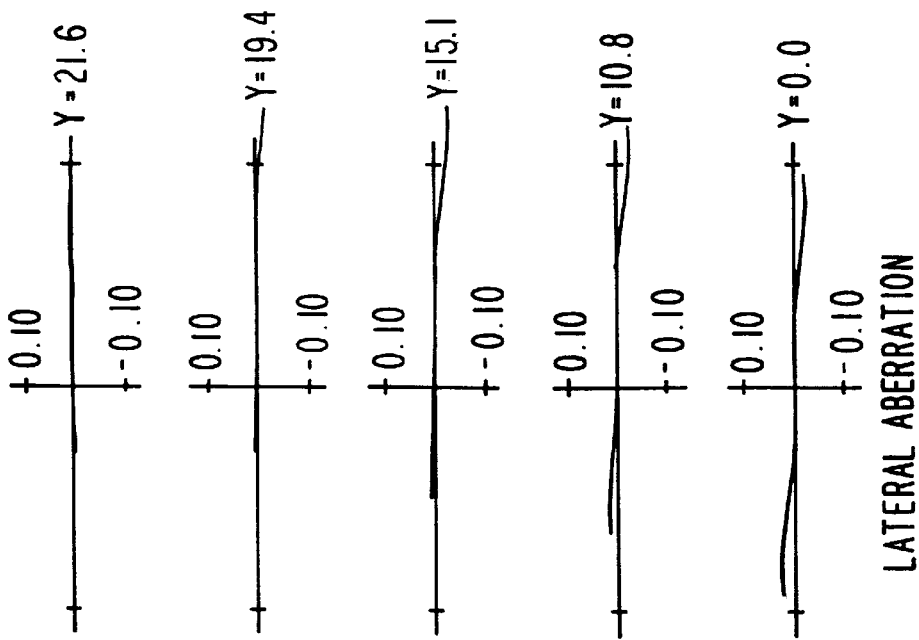
FIG. 4 is a diagram showing various aberrations at the near objective focal state of Embodiment 1.
Figure 4:
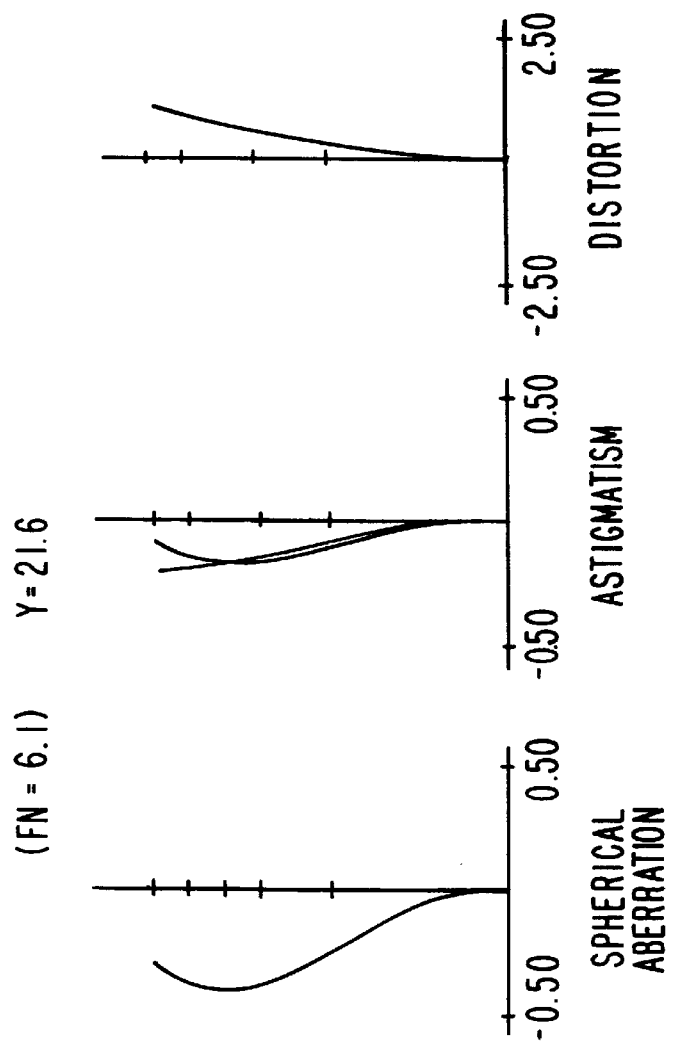

FIGS. 2 through 4 are diagrams showing various aberrations with respect to the d-line (λ=587.6 nm) of Embodiment 1. That is, FIG. 2 is a diagram showing various aberrations at the infinitely far objective focal state. FIG. 3 is a diagram showing various aberrations at the mid-range objective focal state (magnification ½x). FIG. 4 is a diagram showing various aberrations at a near objective focal state (1x).

In each of the aberration diagrams, FN is the F number, Y is the image height. In a diagram showing astigmatism, the solid line is a sagittal image plane and the dotted line is a meridional image plane.

As is apparent from each of the aberration diagrams, the various aberrations are excellently corrected at any range from the infinitely far objective focal state through the near objective focal state.

Embodiment 2

Figure 5:
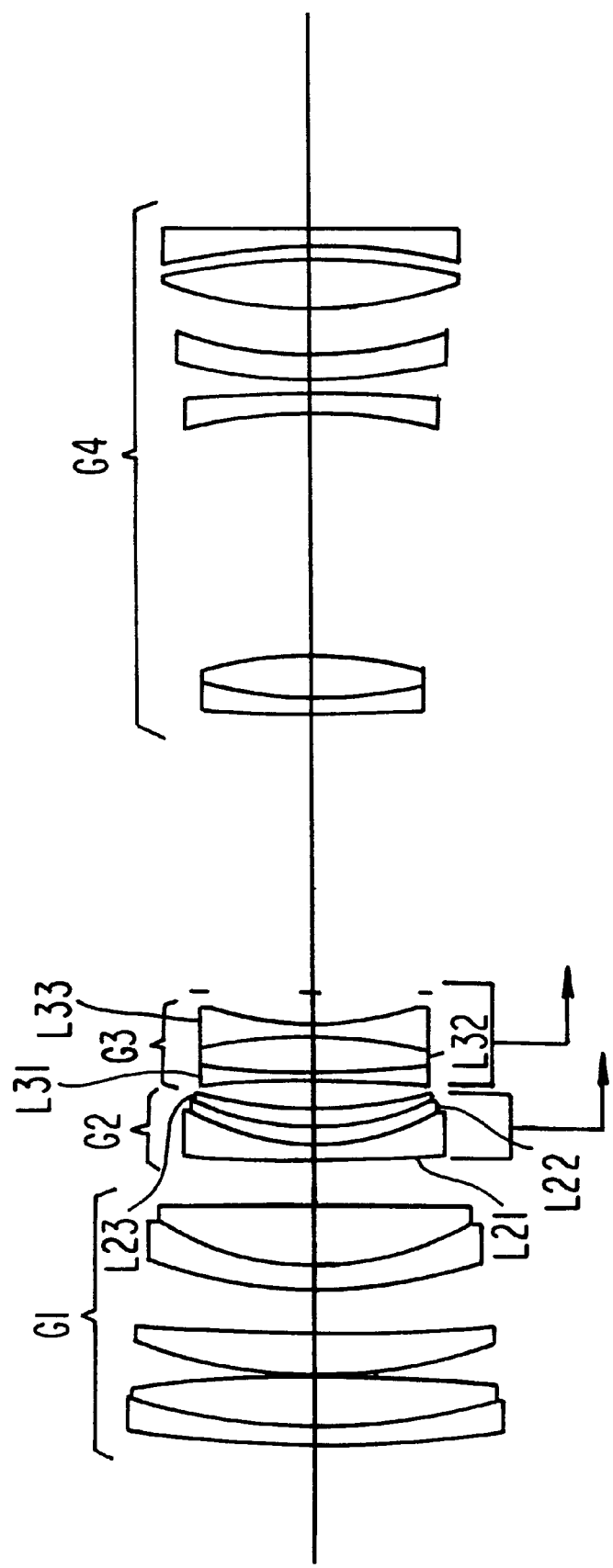
FIG. 5. is a diagram showing the lens layout of Embodiment 2 of the long focal length macrolens system incorporating the principles of the present invention.

FIG. 5 is a diagram showing a lens layout for a long focal length macrolens system of Embodiment 2 of the present invention.

In FIG. 5, the first lens group G1 comprises, in order from the object-side:

a positive compound lens, which is made up of a negative meniscus lens and a biconvex lens, a positive meniscus lens, which has a convex surface facing toward the object-side, and a positive compound lens, which is made up of a negative meniscus lens and a biconvex lens.

The second lens group G2 comprises a negative compound lens made up of, in order from the object-side:

a negative meniscus lens L21, which has a convex surface facing toward the object-side, a positive meniscus lens L22, which has a convex surface facing toward the object-side, and a positive meniscus lens L23, which has a convex surface facing toward the object-side.

The third lens group G3 comprises a negative compound lens, which is made up of, in order from the object-side:

a biconcave lens L31, a biconvex lens L32, and a biconcave lens L33.

The fourth lens group G4 comprises, in order from the object-side:

a positive compound lens, which is made up of a negative meniscus lens which has a convex surface facing toward the object-side and a biconvex lens, a negative meniscus lens, which has a concave surface facing toward the object-side, a negative meniscus lens, which has a convex surface facing toward the object-side, a biconvex lens, and a biconcave lens.

When the focal state is changed from the infinitely far object to the near object, the first lens group G1 and the fourth lens group G4 are fixed, and the second lens group G2 and the third lens group G3 move toward the image-side.

In other words, the second lens group G2 and the third lens group G3 move such that the distance from the first lens group G1 increases. The overall length of the lens system does not change as the distance to the object changes and the distance between the second lens group G2 and the third lens group G3 is maximized at the mid-range objective focal state.

The following Table 2 shows various values obtained in Embodiment 2 of the present invention. In Table 2: f is the focal length; β is the magnification; FN is the F number; 2ω is the field angle; and d0 is the "object distance" (the distance between the frontmost surface of the lens system and the object).

In addition, the number in the left column is the order of the lens surface counted from the object-side; r is the radius of curvature; d is the surface separation between each of the lenses; and n and ν show the refractive index with respect to the d-line (λ=587.6 nm) and the Abbe number respectively.

TABLE 2 f = 180
FN = 4.0
2ω = 13.7°

| | r | d | ν | n |
|---|---|---|---|---|
| 1. | 214.868 | 2.25 | 39.6 | 1.80454 |
| 2. | 76.300 | 6.30 | 82.6 | 1.49782 |

TABLE 2-continued

| | | | | |
|---|---|---|---|---|
| 3. | −182.000 | 0.25 | | |
| 4. | 65.300 | 5.40 | 82.6 | 1.49782 |
| 5. | 293.751 | 5.85 | | |
| 6. | 71.900 | 2.80 | 40.9 | 1.79631 |
| 7. | 36.000 | 7.90 | 65.5 | 1.60300 |
| 8. | −4542.586 | (d8 = variable) | | |
| 9. | 227.315 | 1.60 | 57.0 | 1.62280 |
| 10. | 28.260 | 2.50 | 46.4 | 1.80411 |
| 11. | 38.000 | 2.30 | 39.6 | 1.80454 |
| 12. | 59.148 | (d12 = variable) | | |
| 13. | −113.400 | 1.35 | 46.4 | 1.80411 |
| 14. | 140.000 | 4.30 | 28.6 | 1.79504 |
| 15. | −59.400 | 1.55 | 60.0 | 1.64000 |
| 16. | 44.484 | (d16 = variable) | | |
| 17. | 884.167 | 1.80 | 28.3 | 1.72825 |
| 18. | 77.000 | 5.50 | 60.3 | 1.62041 |
| 19. | −53.636 | 31.10 | | |
| 20. | −68.000 | 2.30 | 45.1 | 1.74400 |
| 21. | −311.579 | 2.30 | | |
| 22. | 81.506 | 2.50 | 56.5 | 1.50137 |
| 23. | 49.879 | 6.20 | | |
| 24. | 58.000 | 6.00 | 53.6 | 1.54739 |
| 25. | −84.841 | 1.80 | | |
| 26. | −100.000 | 2.00 | 45.9 | 1.54814 |
| 27. | 2016.000 | | | |

Various Separations at Each Focal State

| | Infinitely Far Objective Focal State | Mid-Range Objective Focal State | Near Objective Focal State |
|---|---|---|---|
| f/β | 180.0002 | −0.5000 | −1.0000 |
| d0 | ∞ | 431.7529 | 241.7910 |
| d8 | 6.2309 | 14.6676 | 35.3034 |
| d12 | 3.3368 | 11.7735 | 3.3368 |
| d16 | 40.4210 | 23.5476 | 11.3485 |

Conditional Values (1) f2/f1 = −3.40
(2) f2/f3 = 4.72
(3) f4/f1 = 1.50
(4) D3/f3 = −0.14
(5) D2/D3 = 0.89
(8) N31 = 1.80411, N32 = 1.79504, N33 = 1.64000
(9) ν31 = 46.4, ν32 = 28.6, ν33 = 60.0
(10) N21 = 1.62280, N22 = 1.80411, N23 = 1.80454
(11) ν21 = 57.0, ν22 = 46.4, ν23 = 39.6

Figure 6:
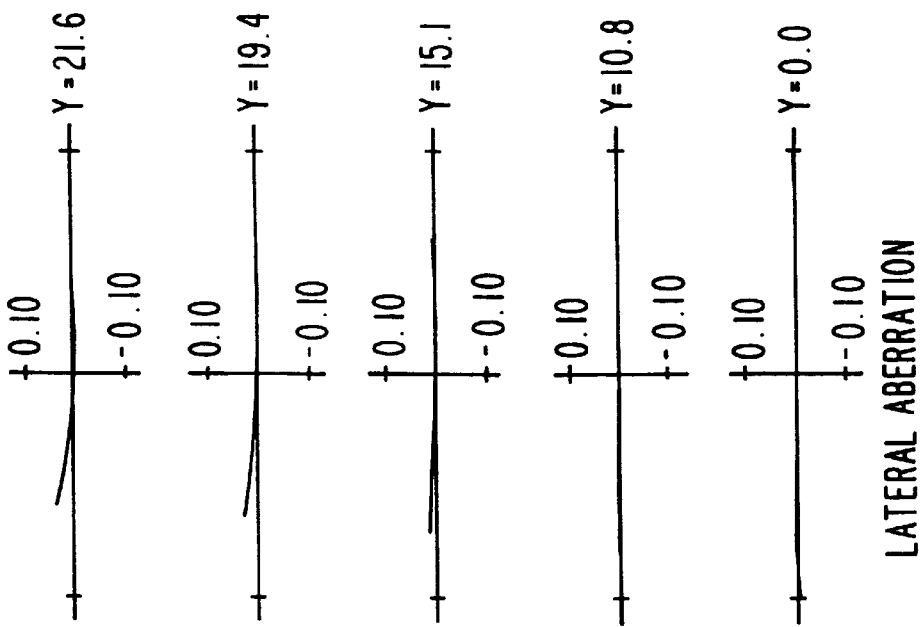
FIG. 6 is diagram showing various aberrations in the infinitely far objective focal state of Embodiment 2.
Figure 6:
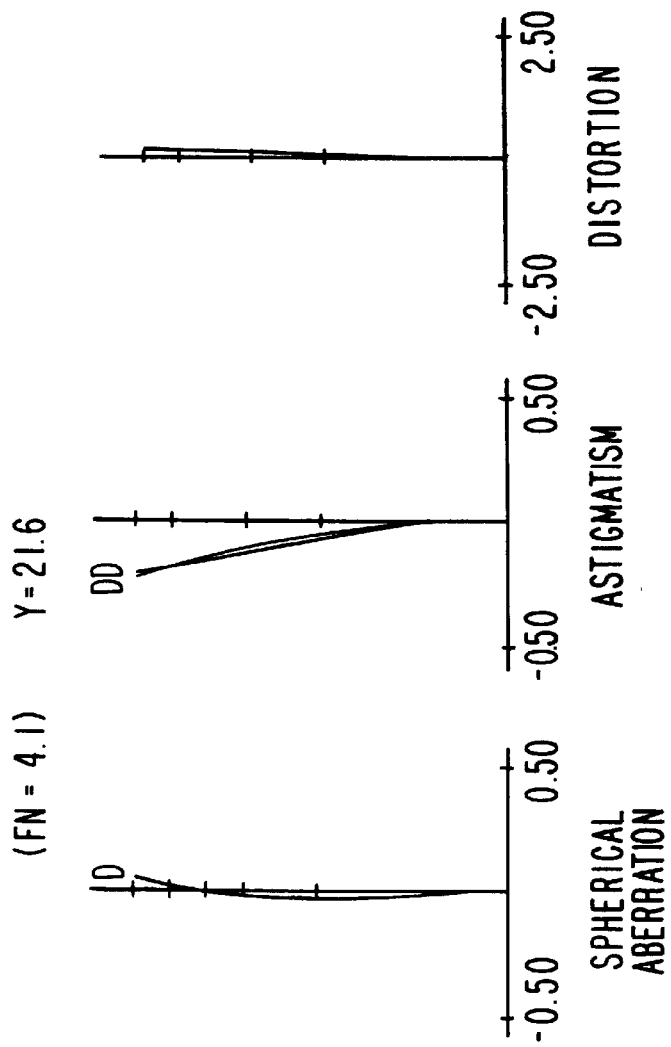
Figure 7:
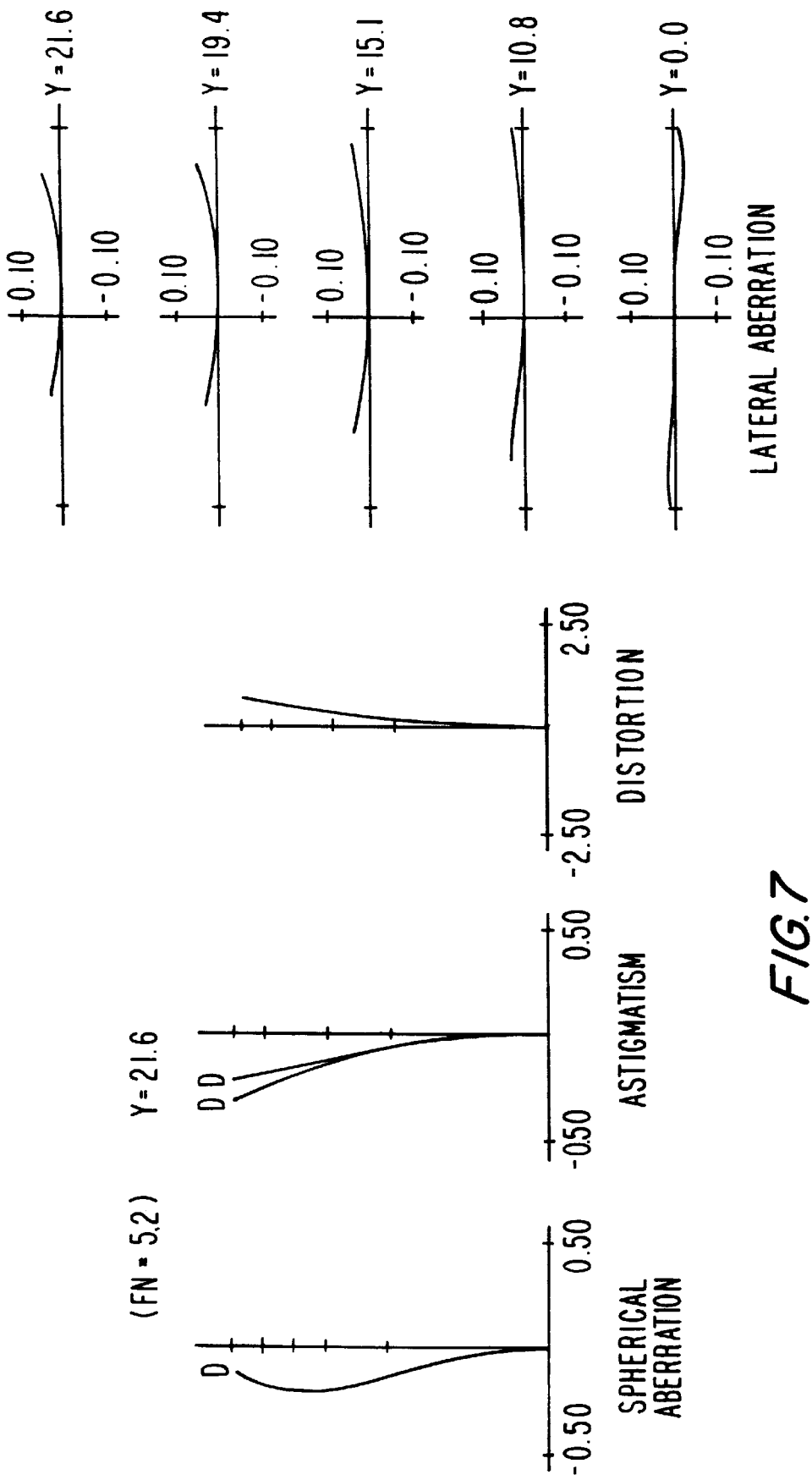
FIG. 7 is a diagram showing various aberrations at the mid-range objective (magnification ½×) focal state of Embodiment 2.
Figure 8:
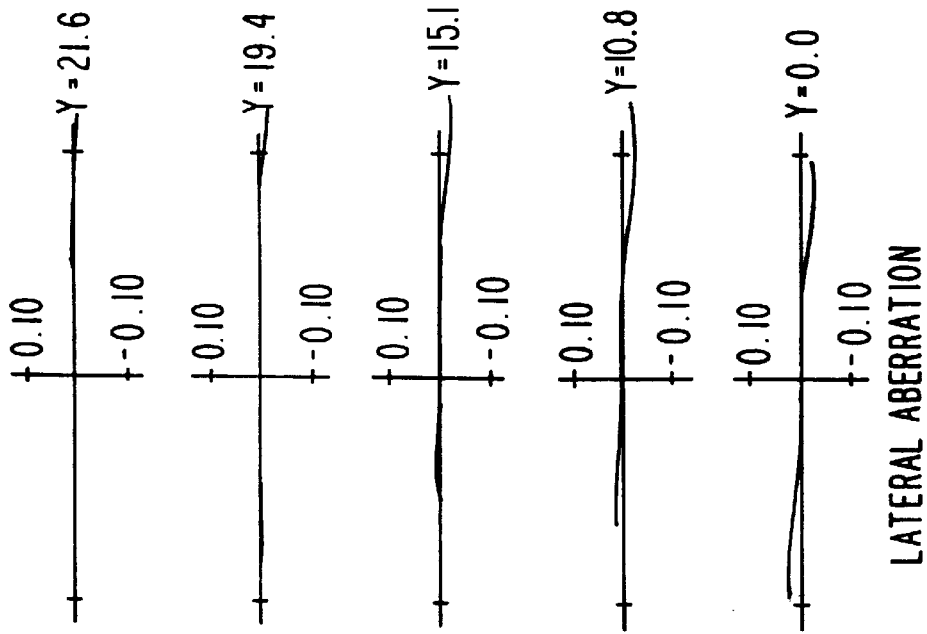
FIG. 8 is a diagram showing various aberrations at the near objective focal state of Embodiment 2.
Figure 8:
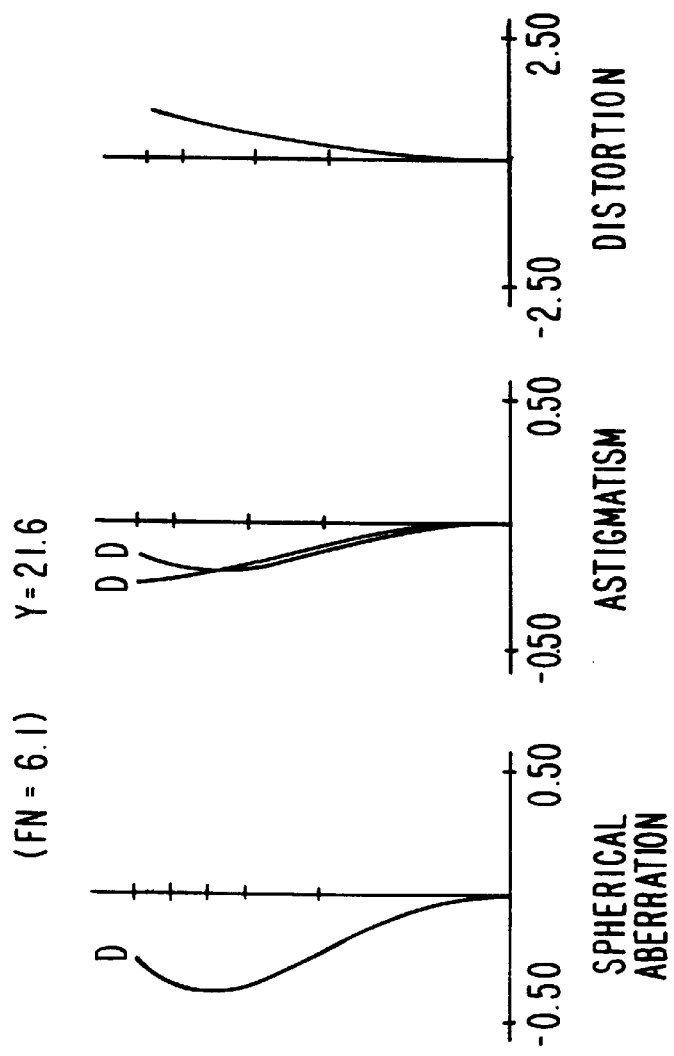

FIGS. 6 through 8 are diagrams showing various aberrations of Embodiment 2 with respect to the d-line (λ=587.6 nm). In other words, FIG. 6 shows diagrams showing various aberrations at the infinitely far objective focal state. FIG. 7 shows diagrams of various aberrations at the mid-range objective focal state. FIG. 8 shows diagrams of various aberrations at the near objective focal state.

In each aberration diagram, FN is the F number and Y is the image height. In a diagram showing astigmatism, the solid line is a sagittal image plane and the dotted line is a meridional image plane.

As is apparent from each of the aberration diagrams that the various aberrations are excellently corrected at any range, from the infinitely far objective focal state through the near objective focal state.

Embodiment 3

Figure 9:
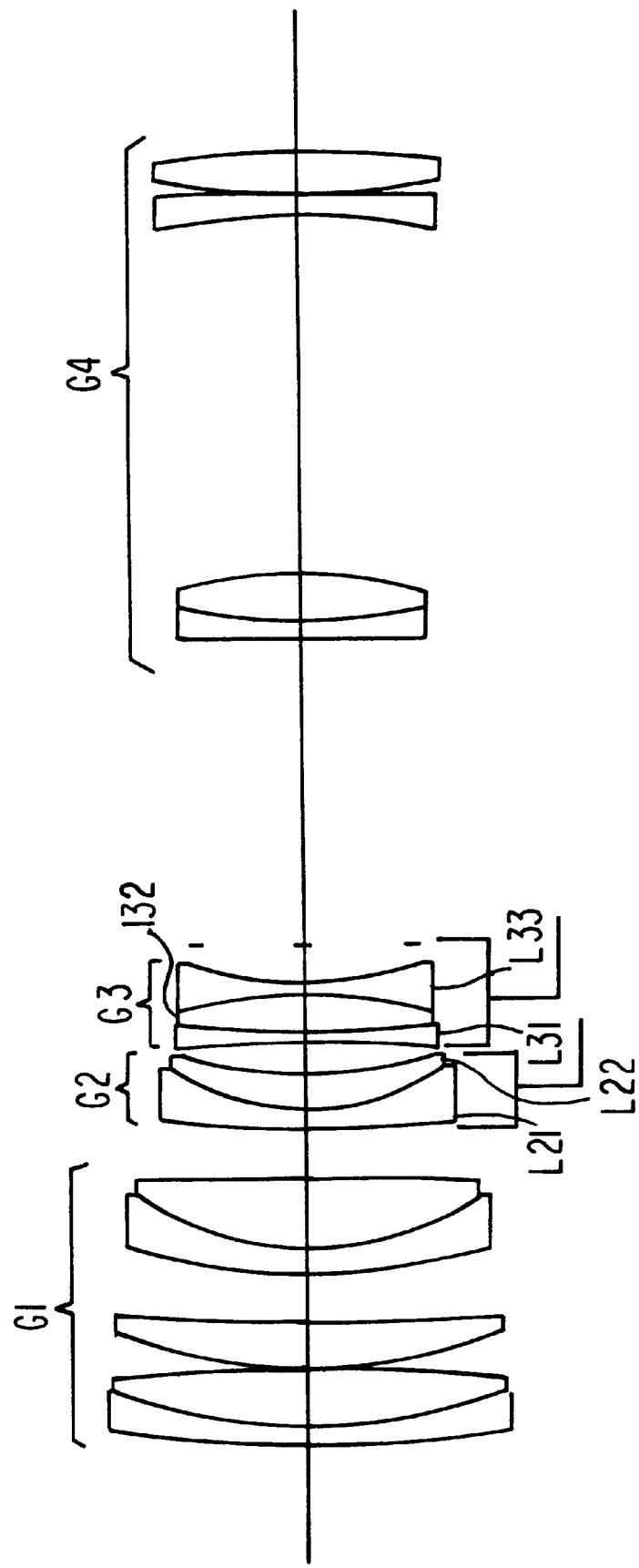
FIG. 9 is a diagram showing the lens layout of Embodiment 3 of the long focal length macrolens system incorporating the principles of the present invention.

FIG. 9 is a lens layout for a long focal length macrolens system of Embodiment 3 of the present invention.

In FIG. 9, a first lens group G1 comprises, in order from the object-side:

a positive compound lens, which is made up of a negative meniscus lens and a biconvex lens, a positive meniscus lens, which has a convex surface facing toward the object-side, and a positive compound lens, which is made up of a negative meniscus lens, which has a convex surface facing toward the object-side, and a positive meniscus lens, which has a convex surface facing toward the object-side.

A second lens group G2 comprises a negative compound lens made up of, in order from the object-side:

a negative meniscus lens L21, which has a convex surface facing toward the object-side, and a positive meniscus lens L22, which has a convex surface facing toward the object-side.

A third lens group G3 comprises a negative compound lens, which is made up of, in order from the object-side:

a biconcave lens L31, a biconvex lens L32, and a biconcave lens L33.

A fourth lens group G4 comprises, in order from the object-side:

a positive compound lens, which is made up of a negative meniscus lens which has a convex surface facing toward the object-side and a biconvex lens, a biconcave lens, and a biconvex lens.

When the focal state is changed from the infinitely far objective to the near objective, the first lens group G1 and the fourth lens group G4 are fixed, and the second lens group G2 and the third lens group G3 move toward the image-side.

In other words, the second lens group G2 and the third lens group G3 move such that the distance from the first lens group G1 increases. The overall length of the lens system does not change as the objective distance changes and the distance between the second lens group G2 and the third lens group G3 is maximized at the mid-range objective focal state.

The following Table 3 shows various values obtained in Embodiment 3 of the present invention. In Table 3: f is the focal length; β is the magnification; FN is the F number; 2ω is the field angle; and d0 is the "object distance" (the distance between the frontmost surface of the lens system and an object).

In addition, the number in the left column is the order of the lens surface counted from the object-side; r is the radius of curvature; d is the surface separation between each of the lenses; and n and ν show the refractive index with respect to the d-line (λ=587.6 nm) and the Abbe number respectively.

TABLE 3 f = 200
FN = 4.0
2ω = 12.3°

|  | r | d | ν | n |
|---|---|---|---|---|
| 1. | 238.742 | 2.50 | 39.6 | 1.80454 |
| 2. | 85.610 | 7.00 | 82.6 | 1.49782 |
| 3. | −198.000 | 0.30 | | |
| 4. | 72.200 | 6.00 | 82.6 | 1.49782 |
| 5. | 326.390 | 6.50 | | |
| 6. | 79.000 | 3.10 | 40.9 | 1.79631 |
| 7. | 39.700 | 8.80 | 65.5 | 1.60300 |
| 8. | 5606.865 | (d8 = variable) | | |
| 9. | 252.272 | 2.00 | 60.3 | 1.62041 |
| 10. | 31.635 | 5.00 | 46.4 | 1.80411 |
| 11. | 65.971 | (d11 = variable) | | |
| 12. | −126.000 | 1.50 | 46.4 | 1.80411 |
| 13. | 166.000 | 4.40 | 28.6 | 1.79504 |
| 14. | −66.000 | 1.70 | 60.0 | 1.64000 |

TABLE 3-continued

| 15. | 49.358 | (d15 = variable) | | |
|---|---|---|---|---|
| 16. | 1040.563 | 2.00 | 31.2 | 1.68893 |
| 17. | 66.100 | 6.00 | 60.3 | 1.62041 |
| 18. | −60.023 | 46.50 | | |
| 19. | −67.700 | 2.50 | 46.8 | 1.76684 |
| 20. | 6038.104 | 0.40 | | |
| 21. | 114.600 | 5.00 | 45.9 | 1.54814 |
| 22. | −143.936 | | | |

Various Separations at Each Focal State

| | Infinitely Far Objective Focal State | Mid-Range Objective Focal State | Near Objective Focal State |
|---|---|---|---|
| f/β | 200.0000 | −0.5000 | −1.0000 |
| d0 | ∞ | 479.8933 | 268.9584 |
| d8 | 6.7335 | 16.0972 | 39.0336 |
| d11 | 3.8020 | 13.1656 | 3.8020 |
| d15 | 44.9932 | 26.2658 | 12.6930 |

Conditional Values (1) f2/f1 = −3.45
(2) f2/f3 = 4.78
(3) f4/f1 = 1.51
(4) D3/f3 = −0.13
(5) D2/D3 = 0.92
(6) N21 = 1.62041, N22 = 1.80411
(7) ν21 = 60.3, ν22 = 46.4
(8) N31 = 1.80411, N32 = 1.79504, N33 = 1.64000
(9) ν31 = 46.4, ν32 = 28.6, ν33 = 60.0

Figure 10:
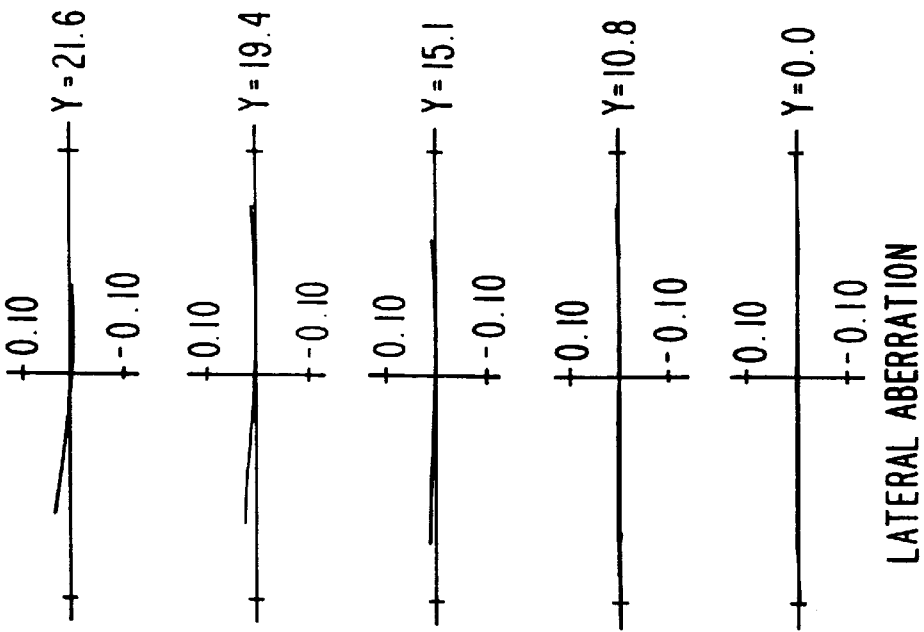
FIG. 10 is a diagram showing various aberrations in the infinitely far objective focal state of Embodiment 3.
Figure 10:
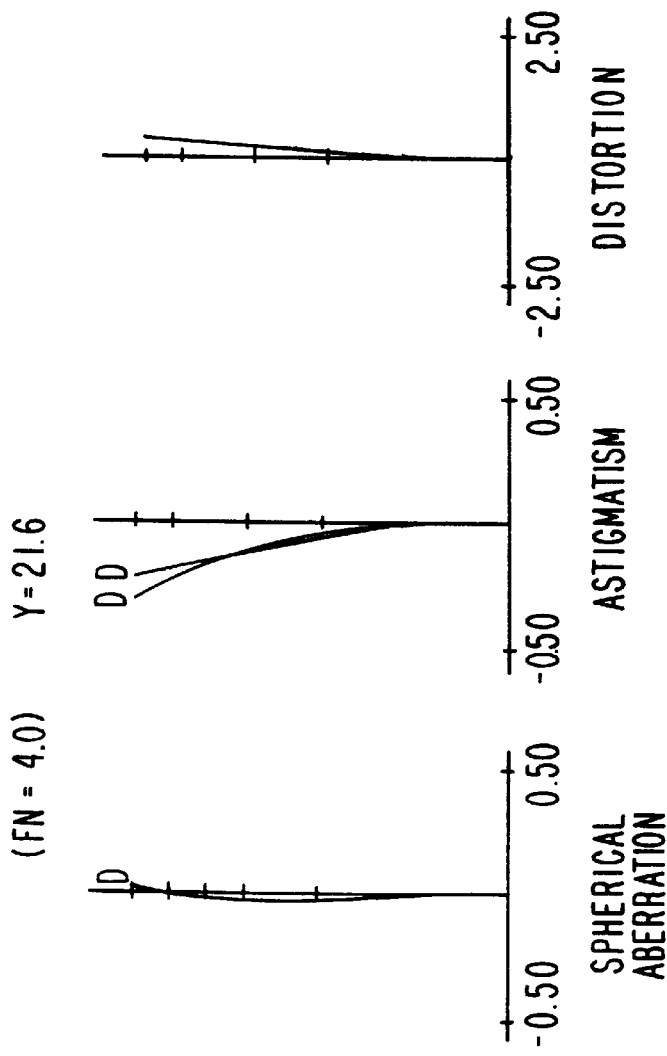
Figure 11:
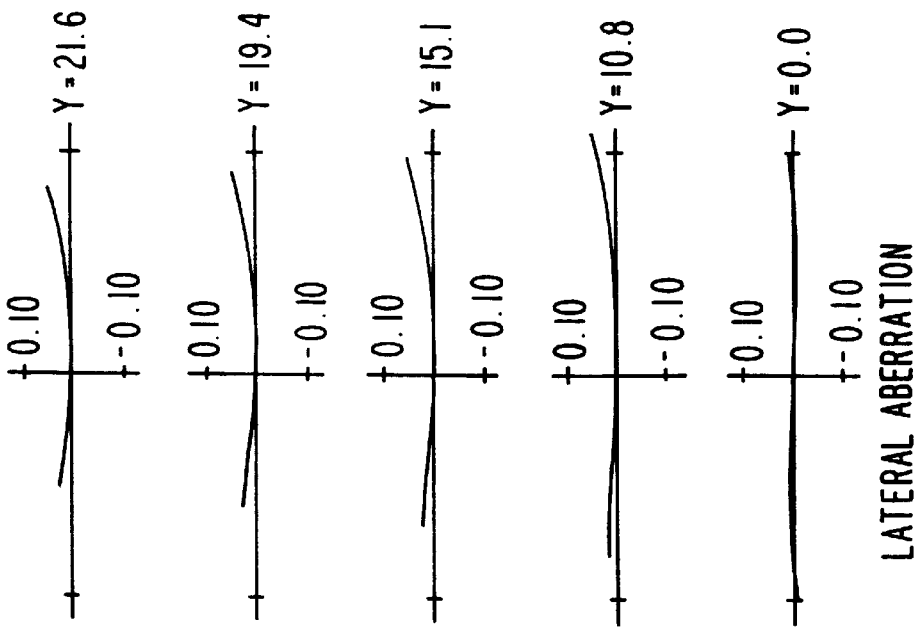
FIG. 11 is a diagram showing various aberrations at the mid-range objective (magnification ½×) focal state of Embodiment 3.
Figure 11:
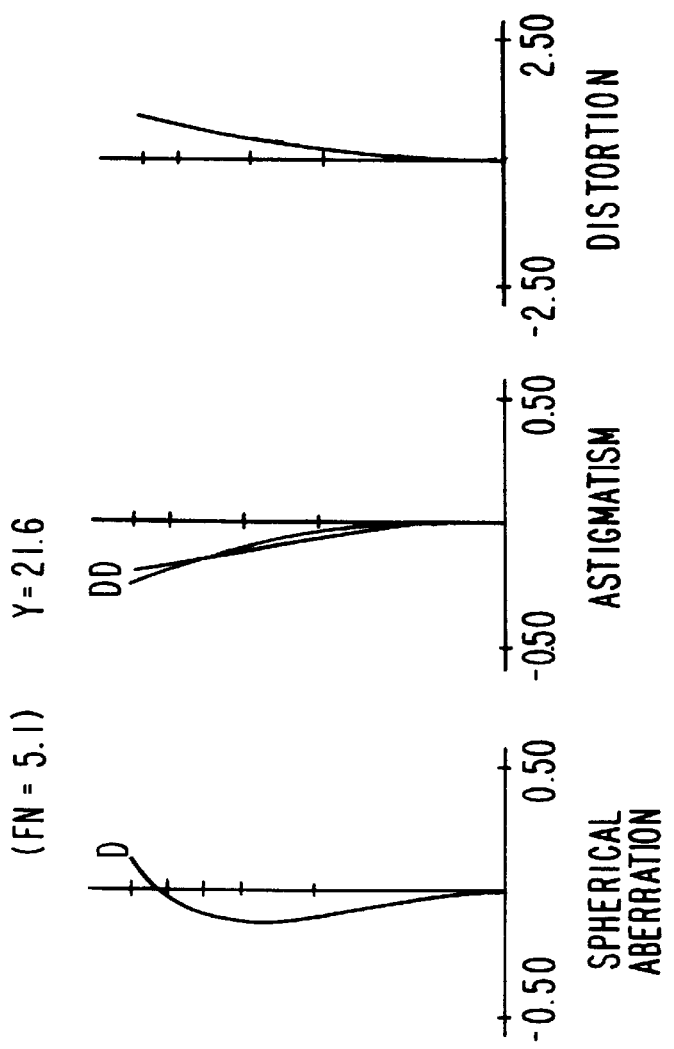
Figure 12:
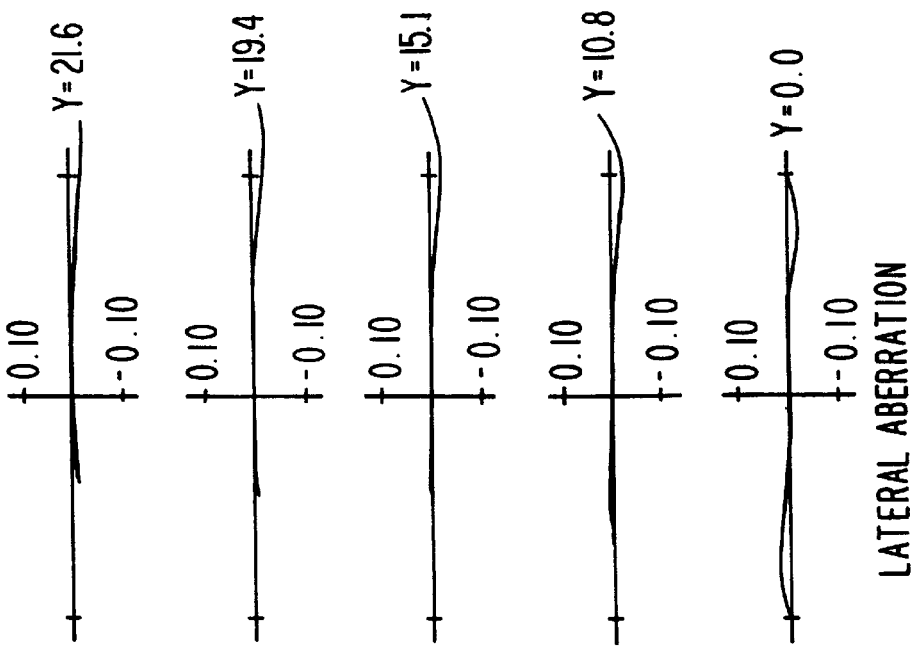
FIG. 12 is a diagram showing various aberrations at the near objective focal state of Embodiment 3.
Figure 12:
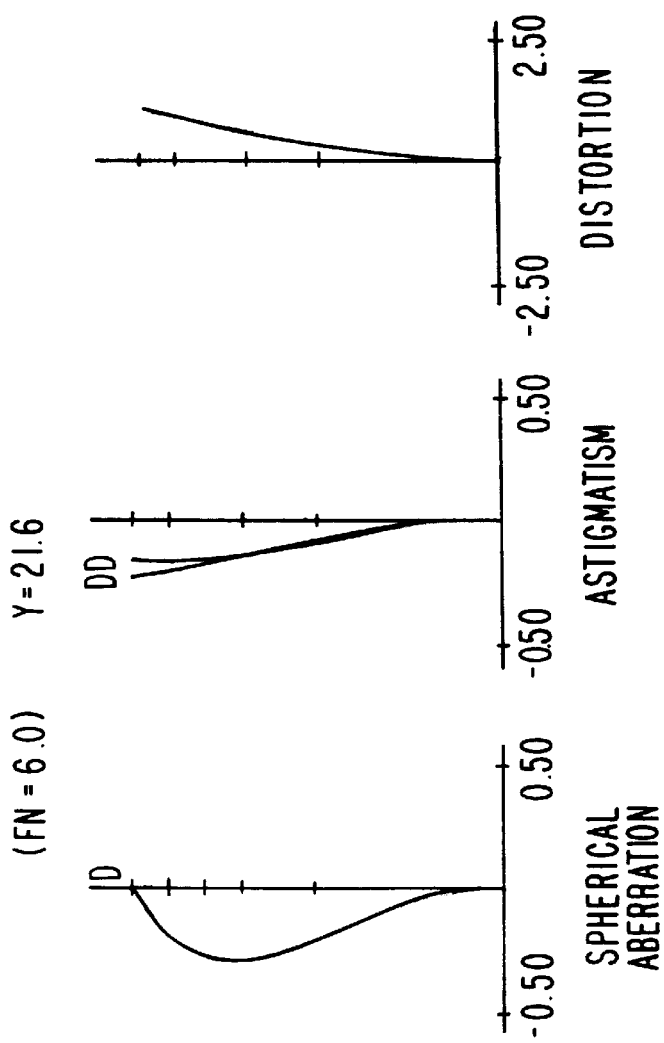

FIGS. 10 through FIG. 12 are diagrams showing various aberrations with respect to the d-line (λ=587.6 nm). In other words, FIG. 10 shows diagrams of various aberrations at the infinitely far objective focal state. FIG. 11 shows diagrams of various aberrations at the mid-range objective focal state of ½×. FIG. 12 shows diagrams of various aberrations at the near objective focal state.

In each aberration diagram, FN is the F number and Y is the image height. In a diagram showing astigmatism, the solid line is a sagittal image plane and the dotted line is a meridional image.

As is apparent from each of the aberration diagrams, the various aberrations are excellently corrected at any range from the infinitely far objective focal state through the near objective focal state.

Embodiment 4

Figure 13:
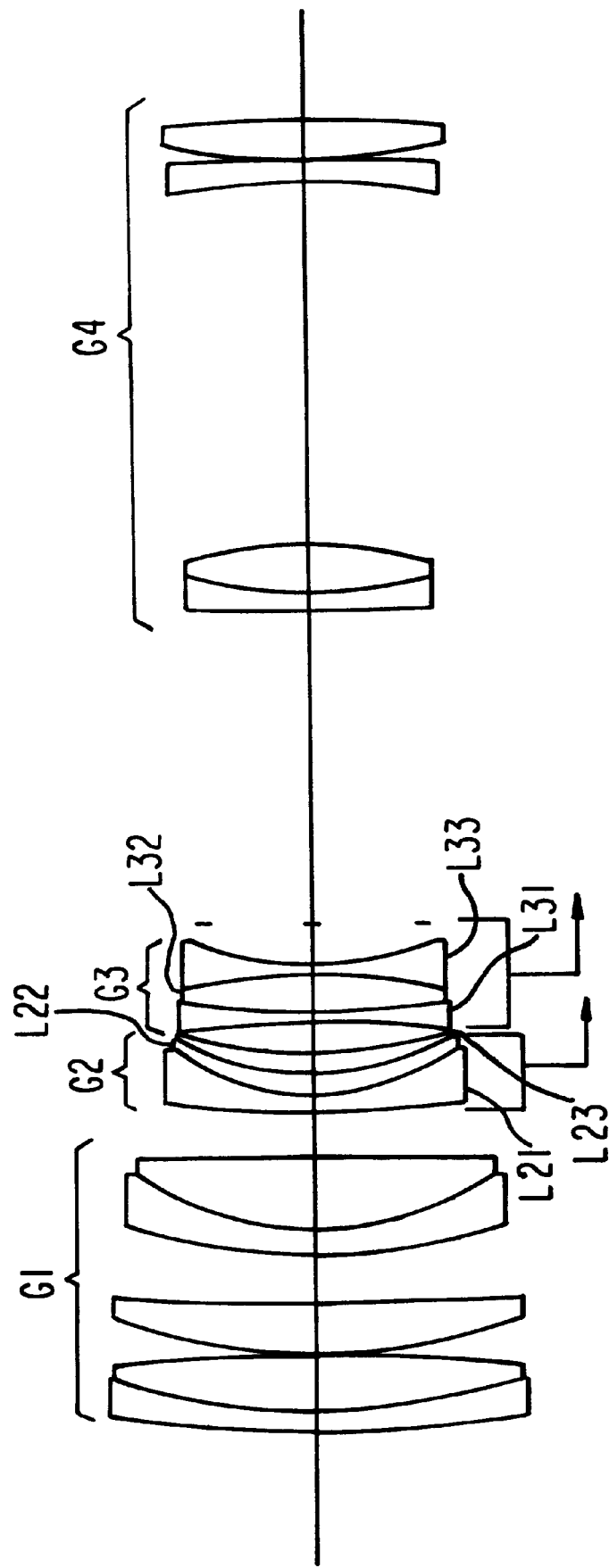
FIG. 13 is a diagram showing the lens layout of Embodiment 4 of the long focal length macrolens system incorporating the principles of the present invention.

FIG. 13 is a diagram showing a lens layout for a long focal length macrolens system of Embodiment 4 of the present invention.

In FIG. 13, a first lens group G1 comprises, in order from the object-side:

a positive compound lens, which is made up of a negative meniscus lens, which has a convex surface facing toward the object-side and a biconvex lens, a positive meniscus lens, which has a convex surface facing toward the object-side, and a positive compound lens, which is made up of a negative meniscus lens, which has a convex surface facing toward the object-side, and a positive meniscus lens, which has a convex surface facing toward the object-side.

A second lens group G2 comprises a negative compound lens made up of, in order from the object-side:

a negative meniscus lens L21, which has a convex surface facing toward the object-side, a positive meniscus lens L22, which has a convex surface facing toward the object-side, a positive meniscus lens L23, which has a convex surface facing toward the object-side.

A third lens group G3 comprises a negative compound lens, which is made up of, in order from the object-side:

a biconcave lens L31, a biconvex lens L32, and a biconcave lens L33.

A fourth lens group G4 comprises, in order from the object-side:

a positive compound lens, which is made up of a positive meniscus lens, which has a convex surface facing toward the object-side and a biconvex lens, a biconcave lens, and a biconvex lens.

When the focal state changes from the infinitely far objective state to the near objective state, the first lens group G1 and the fourth lens group G4 are fixed, and the second lens group G2 and the third lens group G3 move toward the image-side.

In other words, the second lens group G2 and the third lens group G3 move such that the distance from the first lens group G1 increases. The overall length of the lens system does not change as the objective distance changes and the distance between the second lens group G2 and the third lens group G3 is maximized at the mid-range objective focal state.

The following Table 4 shows various values obtained in Embodiment 4 of the present invention. In Table 4: f is the focal length; β is the magnification; FN is the F number; 2ω is the field angle; and d0 is the "object distance" (the distance between the frontmost surface of the lens system and an object).

In addition, the number in the left column is the order of the lens surface counted from the object-side; r is the radius of curvature; d is the surface separation between each of the lenses; and n and ν show the refractive index with respect to the d-line (λ=587.6 nm) and the Abbe number respectively.

TABLE 4 f = 200
FN = 4.0
2ω = 12.3°

|  | r | d | ν | n |
|---|---|---|---|---|
| 1. | 238.742 | 2.50 | 39.6 | 1.80454 |
| 2. | 85.610 | 7.00 | 82.6 | 1.49782 |
| 3. | −198.000 | 0.30 | | |
| 4. | 72.200 | 6.00 | 82.6 | 1.49782 |
| 5. | 326.390 | 6.50 | | |
| 6. | 79.000 | 3.10 | 40.9 | 1.79631 |
| 7. | 39.700 | 8.80 | 65.5 | 1.60300 |
| 8. | 5606.865 | (d8 = variable) | | |
| 9. | 251.151 | 1.80 | 54.0 | 1.61720 |
| 10. | 31.457 | 2.80 | 46.4 | 1.80411 |
| 11. | 37.000 | 2.50 | 39.6 | 1.80454 |
| 12. | 65.099 | (d12 = variable) | | |
| 13. | −125.000 | 1.50 | 46.4 | 1.80411 |
| 14. | 166.000 | 4.40 | 28.6 | 1.79504 |
| 15. | −66.000 | 1.70 | 60.0 | 1.64000 |
| 16. | 49.557 | (d16 = variable) | | |
| 17. | 1040.563 | 2.00 | 31.2 | 1.68893 |
| 18. | 66.100 | 6.00 | 60.3 | 1.62041 |
| 19. | −60.023 | 46.50 | | |
| 20. | −67.700 | 2.50 | 46.8 | 1.76684 |
| 21. | 6038.104 | 0.40 | | |
| 22. | 114.602 | 5.00 | 45.9 | 1.54814 |
| 23. | −146.457 | | | |

TABLE 4-continued

| Various Separations at Each Focal State | | | |
|---|---|---|---|
| | Infinitely Far Objective Focal State | Mid-Range Objective Focal State | Near Objective Focal State |
| f/β | 200.0007 | −0.5000 | −1.0000 |
| d0 | ∞ | 479.3032 | 268.4425 |
| d8 | 6.6619 | 16.0260 | 39.0502 |
| d12 | 3.8799 | 13.2440 | 3.8799 |
| d16 | 44.9805 | 26.2523 | 12.5922 |

| Conditional Values | |
|---|---|
| (1) | f2/f1 = −3.45 |
| (2) | f2/f3 = 4.78 |
| (3) | f4/f1 = 1.51 |
| (4) | D3/f3 = −0.13 |
| (5) | D2/D3 = 0.93 |
| (8) | N31 = 1.80411, N32 = 1.79504, N33 = 1.64000 |
| (9) | ν31 = 46.4, ν32 = 28.6, ν33 = 60.0 |
| (10) | N21 = 1.61720, N22 = 1.80411, N23 = 1.80454 |
| (11) | ν21 = 54.0, ν22 = 46.4, ν23 = 39.6 |

Figure 14:
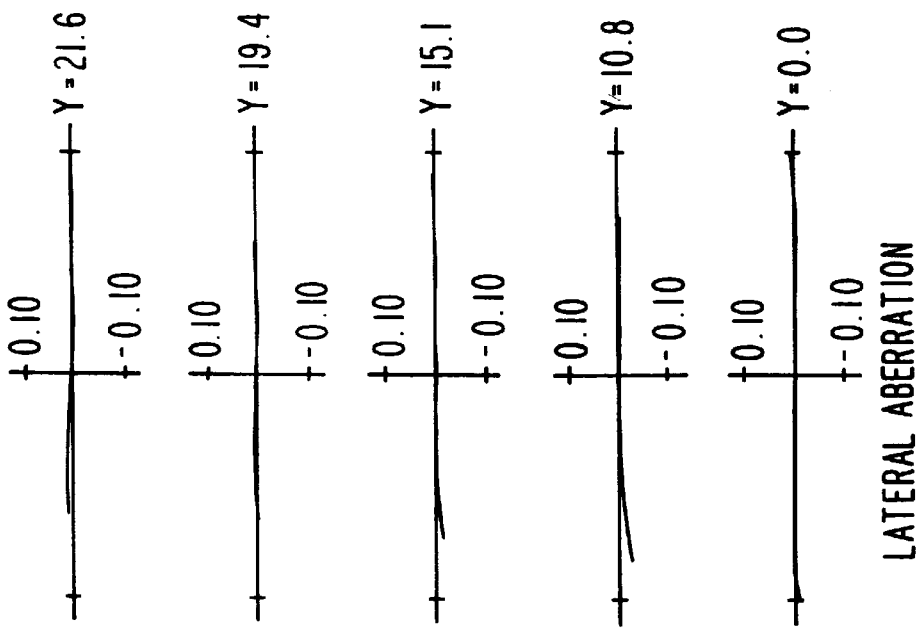
FIG. 14 is diagram showing various aberrations at the taking infinitely far distance state of Embodiment 4.
Figure 14:
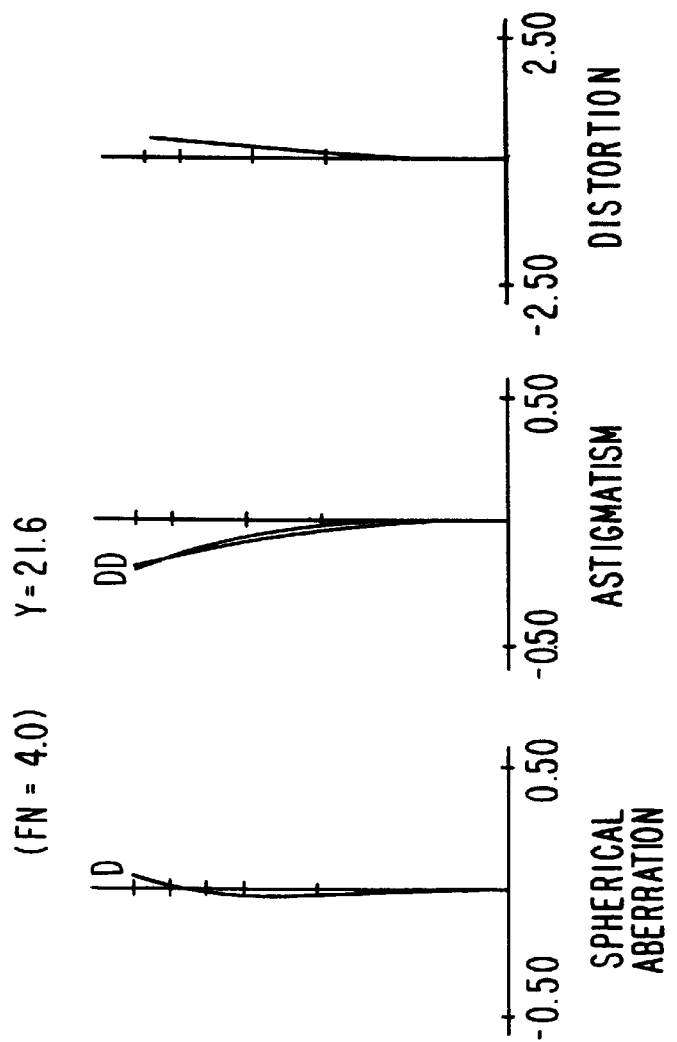
Figure 15:
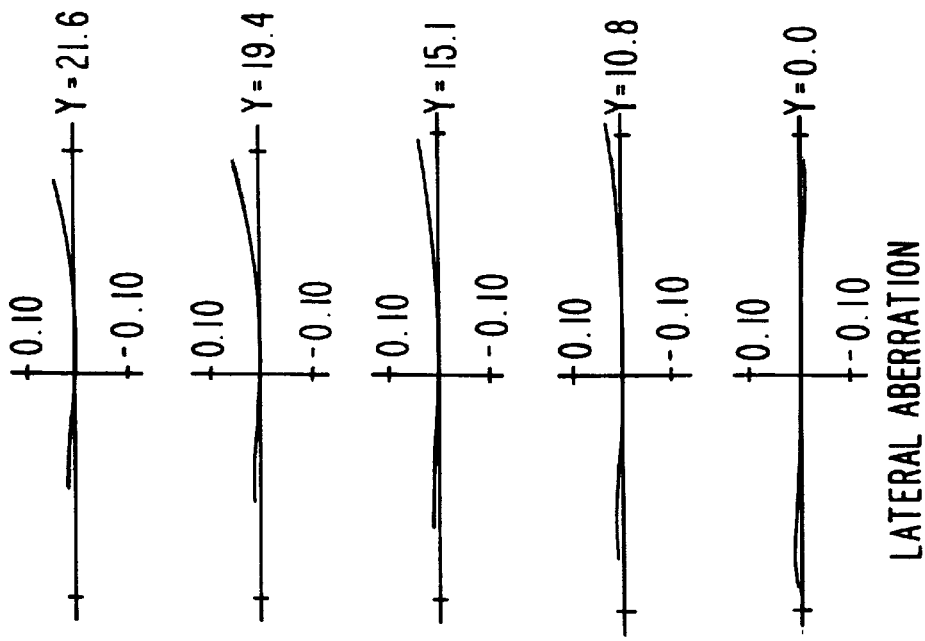
FIG. 15 diagram showing various aberrations at the mid-range (magnification ½×) focusing state of Embodiment 4.
Figure 15:
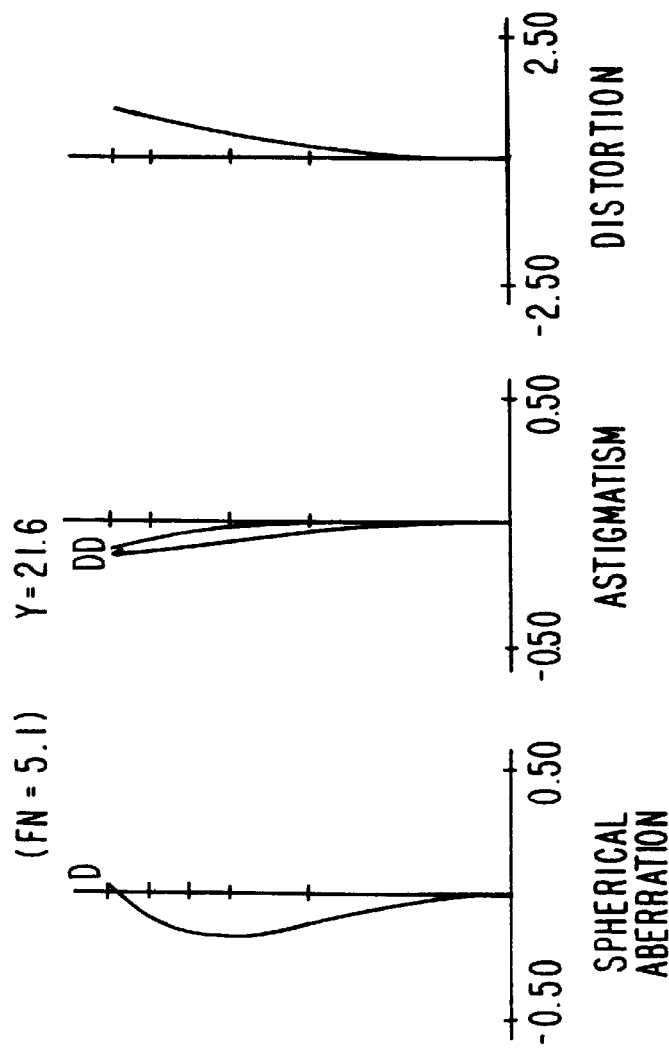
Figure 16:
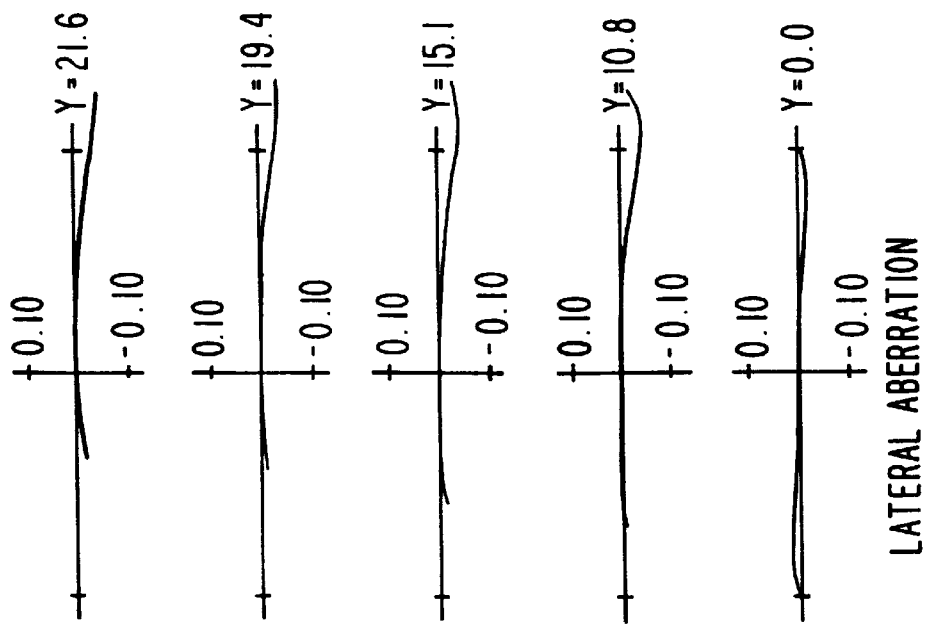
FIG. 16 is a diagram showing various aberrations at taking the near distance state of Embodiment 4.
Figure 16:
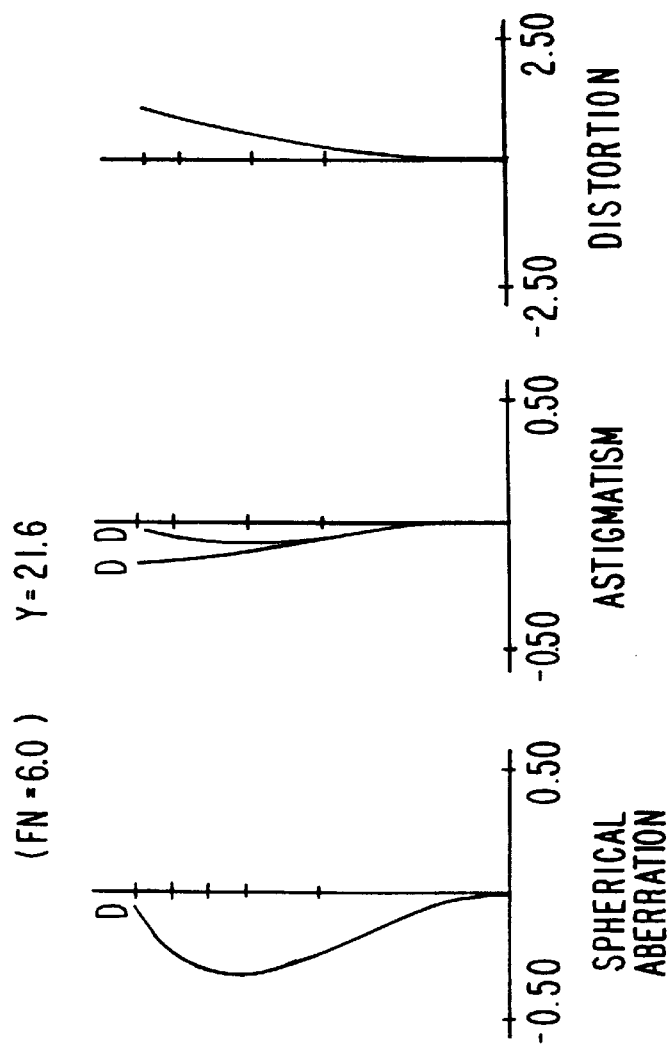

FIGS. 14 through 16 are diagrams showing various aberrations with respect to the d-line (λ=587.6 nm). In other words, FIG. 14 shows diagrams of various aberrations at the infinitely far objective focal state. FIG. 15 shows diagrams of various aberrations at the mid-range objective focal state of ½×. FIG. 16 shows diagrams of various aberrations at the near objective focal state.

In each aberration diagram, FN is the F number and Y is the image height. In a diagram showing astigmatism, the solid line is a sagittal image plane and the dotted line is a meridional image plane.

As is apparent from each of the aberration diagrams, the various aberrations are excellently corrected at any range from the infinitely far objective focal state through the near objective focal state.

As described above, the apparatus incorporating the principles of the present invention reduces the size of the focusing lens group, which makes automatic focusing easy. It excellently corrects aberrations with little fluctuation. Therefore, the apparatus incorporating the principles of the present invention provides a compact, high-performance, long focal length macrolens system capable of photographing an object at an infinitely far objective state to a near objective state without changing the overall length of the lens system.

Various modifications will become possible for those skilled in the art after receiving the teachings of the present disclosure without departing from the scope thereof.

what is claimed is:

1. A long focal length macrolens system comprising, in order from the object-side:

a first lens group G1, having a negative lens and a positive overall refractive power;

a second lens group G2, having a compound lens and a negative overall refractive power;

a third lens group G3, having a compound lens and a negative overall refractive power; and a fourth lens group G4, having a positive refractive power; wherein the following conditions (1) through (3) are fulfilled:

$$-5 < f2/f1 < -2 \tag{1}$$

$$2.5 < f2/f3 < 7.5 \tag{2}$$

$$1 < f4/f1 < 2 \tag{3}$$

where
- f1 is the focal length of said first lens group G1;
- f2 is the focal length of said second lens group G2;
- f3 is the focal length of said third lens group G3; and
- f4 is the focal length of said fourth lens group G4.

2. A system, as claimed in claim 1, wherein, during focusing of said system from an object at an infinitely far distance to an object at a close distance, said first lens group G1 is fixed, and said second lens group G2 and said third lens group G3 move toward the image-side of said system.

3. A system, as claimed in claim 2, wherein the distance between said second lens group G2 and said third lens group G3 is maximized at the mid-range objective focal state.

4. A system, as claimed in claim 1, wherein the following conditions (4) and (5) are fulfilled:

$$-0.1 < D3/f3 < -0.15 \quad (4)$$
$$0.8 < D2/D3 < 1.2 \quad (5)$$

where
- f3 is the focal length of said third lens group G3;
- D2 is the distance between the frontmost surface of said second lens group G2 and the rearmost surface of said second lens group G2; and
- D3 is the distance between the frontmost surface of said third lens group G3 and the rearmost surface of said third lens group G3.

5. A system, as claimed in claim 2, wherein the following conditions (4) and (5) are fulfilled:

$$-0.1 < D3/f3 < -0.15 \quad (4)$$
$$0.8 < D2/D3 < 1.2 \quad (5)$$

where
- f3 is the focal length of said third lens group G3;
- D2 is the distance between the frontmost surface of said second lens group G2 and the rearmost surface of said second lens group G2; and
- D3 is the distance between the frontmost surface of said third lens group G3 and the rearmost surface of said third lens group G3.

6. A system, as claimed in claim 3, wherein the following conditions (4) and (5) are fulfilled:

$$-0.1 < D3/f3 < -0.15 \quad (4)$$
$$0.8 < D2/D3 < 1.2 \quad (5)$$

where
- f3 is the focal length of said third lens group G3;
- D2 is the distance between the frontmost surface of said second lens group G2 and the rearmost surface of said second lens group G2; and
- D3 is the distance between the frontmost surface of said third lens group G3 and the rearmost surface of said third lens group G3.

7. A system, as claimed in claim 1, wherein said compound lens of said second lens group G2 is made up by bonding, in order from the object-side, lenses L21 and L22; said compound lens of said third lens group G3 is made up by bonding, in order from the object-side, lenses L31, L32, and L33; and wherein the following conditions (6) through (9) are fulfilled:

$$N21 < 1.68 \text{ and } 1.76 < N22 \quad (6)$$
$$v22 < v21 \quad (7)$$
$$N33 < 1.68, \ 1.76 < N31 \text{ and } 1.76 < N32 \quad (8)$$
$$v32 < v31 < v33 \quad (9)$$

where
- N21 is the refractive index with respect to the d-line of lens L21 of said second lens group G2;
- N22 is the refractive index with respect to the d-line of lens L22 of said second lens group G2;
- N31 is the refractive index with respect to the d-line of lens L31 of said third lens group G3;
- N32 is the refractive index with respect to the d-line of lens L32 of said third lens group G3;
- N33 is the refractive index with respect to the d-line of lens L33 of said third lens group G3;
- v21 is the Abbe number of lens L21 of said second lens group G2;
- v22 is the Abbe number of lens L22 of said second lens group G2;
- v31 is the Abbe number of lens L31 of said third lens group G3;
- v32 is the Abbe number of lens L32 of said third lens group G3; and
- v33 is the Abbe number of lens L33 of said third lens group G3.

8. A system, as claimed in claim 2, wherein said compound lens of said second lens group G2 is made up by bonding, in order from the object-side, lenses L21 and L22; said compound lens of said third lens group G3 is made up by bonding, in order from the object-side, lenses L31, L32, and L33; and wherein the following conditions (6) through (9) are fulfilled:

$$N21 < 1.68 \text{ and } 1.76 < N22 \quad (6)$$
$$v22 < v21 \quad (7)$$
$$N33 < 1.68, \ 1.76 < N31 \text{ and } 1.76 < N32 \quad (8)$$
$$v32 < v31 < v33 \quad (9)$$

where
- N21 is the refractive index with respect to the d-line of lens L21 of said second lens group G2;
- N22 is the refractive index with respect to the d-line of lens L22 of said second lens group G2;
- N31 is the refractive index with respect to the d-line of lens L31 of said third lens group G3;
- N32 is the refractive index with respect to the d-line of lens L32 of said third lens group G3;
- N33 is the refractive index with respect to the d-line of lens L33 of said third lens group G3;
- v21 is the Abbe number of lens L21 of said second lens group G2;
- v22 is the Abbe number of lens L22 of said second lens group G2;
- v31 is the Abbe number of lens L31 of said third lens group G3;
- v32 is the Abbe number of lens L32 of said third lens group G3; and
- v33 is the Abbe number of lens L33 of said third lens group G3.

9. A system as claimed in claim 3, wherein said compound lens of said second lens group G2 is made up by bonding, in order from the object-side, lenses L21 and L22; said compound lens of said third lens group G3 is made up by bonding, in order from the object-side, lenses L31, L32, and L33; and wherein the following conditions (6) through (9) are fulfilled:

$$N21 < 1.68 \text{ and } 1.76 < N22 \qquad (6)$$

$$v22 < v21 \qquad (7)$$

$$N33 < 1.68, 1.76 < N31 \text{ and } 1.76 < N32 \qquad (8)$$

$$v32 < v31 < v33 \qquad (9)$$

where

N21 is the refractive index with respect to the d-line of lens L21 of said second lens group G2;

N22 is the refractive index with respect to the d-line of lens L22 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G3;

v21 is the Abbe number of lens L21 of said second lens group G2;

v22 is the Abbe number of lens L22 of said second lens group G2;

v31 is the Abbe number of lens L31 of said third lens group G3;

v32 is the Abbe number of lens L32 of said third lens group G3; and v33 is the Abbe number of lens L33 of said third lens group G3.

10. A system, as claimed in claim 4, wherein said compound lens of said second lens group G2 is made up by bonding, in order from the object-side, lenses L21 and L22; said compound lens of said third lens group G3 is made up by bonding, in order from the object-side, lenses L31, L32, and L33; and wherein the following conditions (6) through (9) are fulfilled:

$$N21 < 1.68 \text{ and } 1.76 < N22 \qquad (6)$$

$$v22 < v21 \qquad (7)$$

$$N33 < 1.68, 1.76 < N31 \text{ and } 1.76 < N32 \qquad (8)$$

$$v32 < v31 < v33 \qquad (9)$$

where

N21 is the refractive index with respect to the d-line of lens L21 of said second lens group G2;

N22 is the refractive index with respect to the d-line of lens L22 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G31;

v21 is the Abbe number of lens L21 of said second lens group G2;

v22 is the Abbe number of lens L22 of said second lens group G2;

v31 is the Abbe number of lens L31 of said third lens group G3;

v32 is the Abbe number of lens L32 of said third lens group G3; and v33 is the Abbe number of lens L33 of said third lens group G3.

11. A system, as claimed in claim 1, wherein said compound lens of the said second lens group G2 is made up by bonding, in order from the object-side, lenses L21, L22, and L23; said compound lens of said third lens group G3 is made up by bonding, in order from the object-side, lenses L31, L32, and L33; and wherein the following conditions (8) through (11) are fulfilled:

$$N33 < 1.68, 1.76 < N31 \text{ and } 1.76 < N32 \qquad (8)$$

$$v32 < v31 < v33 \qquad (9)$$

$$N21 < 1.68, 1.76 < N22 \text{ and } 1.76 < N23 \qquad (10)$$

$$v23 < v22 < v21 \qquad (11)$$

where

N21 is the refractive index with respect to the d-line of lens L21 of said second lens group G2;

N22 is the refractive index with respect to the d-line of lens L22 of said second lens group G2;

N23 is the refractive index with respect to the d-line of lens L23 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G3;

v21 is the Abbe number of lens L21 of said second lens group G2;

v22 is the Abbe number of lens L22 of said second lens group G2;

v23 is the Abbe number of lens L23 of said second lens group G2;

v31 is the Abbe number of lens L31 of said third lens group G3;

v32 is the Abbe number of lens L32 of said third lens group G3; and v33 is the Abbe number of lens L33 of said third lens group G3.

12. A system, as claimed in claim 2, wherein said compound lens of the said second lens group G2 is made up by bonding, in order from the object-side, lenses L21, L22, and L23; said compound lens of said third lens group G3 is made up by bonding, in order from the object-side, lenses L31, L32, and L33; and wherein the following conditions (8) through (11) are fulfilled:

$$N33 < 1.68, 1.76 < N31 \text{ and } 1.76 < N32 \qquad (8)$$

$$v32 < v31 < v33 \qquad (9)$$

$$N21 < 1.68, 1.76 < N22 \text{ and } 1.76 < N23 \qquad (10)$$

$$v23 < v22 < v21 \qquad (11)$$

where

N21 is the refractive index with respect to the d-line of lens L21 of said second lens group G2;

N22 is the refractive index with respect to the d-line of lens L22 of said second lens group G2;

N23 is the refractive index with respect to the d-line of lens L23 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G3;

ν21 is the Abbe number of lens L21 of said second lens group G2;

ν22 is the Abbe number of lens L22 of said second lens group G2;

ν23 is the Abbe number of lens L23 of said second lens group G2;

ν31 is the Abbe number of lens L31 of said third lens group G3;

ν32 is the Abbe number of lens L32 of said third lens group G3; and

ν33 is the Abbe number of lens L33 of said third lens group G3.

13. A system, as claimed in claim 3, wherein said compound lens of the said second lens group G2 is made up by bonding, in order from the object-side, lenses L21, L22, and L23; said compound lens of said third lens group G3 is made up by bonding, in order from the object-side, lenses L31, L32, and L33; and wherein the following conditions (8) through (11) are fulfilled:

$$N33<1.68, 1.76<N31 \text{ and } 1.76<N32 \tag{8}$$

$$\nu32<\nu31<\nu33 \tag{9}$$

$$N21<1.68, 1.76<N22 \text{ and } 1.76<N23 \tag{10}$$

$$\nu23<\nu22<\nu21 \tag{11}$$

where

N21 is the refractive index with respect to the d-line of lens L21 of said second lens group G2;

N22 is the refractive index with respect to the d-line of lens L22 of said second lens group G2;

N23 is the refractive index with respect to the d-line of lens L23 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G3;

ν21 is the Abbe number of lens L21 of said second lens group G2;

ν22 is the Abbe number of lens L22 of said second lens group G2;

ν23 is the Abbe number of lens L23 of said second lens group G2;

ν31 is the Abbe number of lens L31 of said third lens group G3;

ν32 is the Abbe number of lens L32 of said third lens group G3; and

ν33 is the Abbe number of lens L33 of said third lens group G3.

14. A system, as claimed in claim 4, wherein said compound lens of the said second lens group G2 is made up by bonding, in order from the object-side, lenses L21, L22, and L23; said compound lens of said third lens group G3 is made up by bonding, in order from the object-side, lenses L31, L32, and L33; and wherein the following conditions (8) through (11) are fulfilled:

$$N33<1.68, 1.76<N31 \text{ and } 1.76<N32 \tag{8}$$

$$\nu32<\nu31<\nu33 \tag{9}$$

$$N21<1.68, 1.76<N22 \text{ and } 1.76<N23 \tag{10}$$

$$\nu23<\nu22<\nu21 \tag{11}$$

where

N21 is the refractive index with respect to the d-line of lens L21 of said second lens group G2;

N22 is the refractive index with respect to the d-line of lens L22 of said second lens group G2;

N23 is the refractive index with respect to the d-line of lens L23 of said second lens group G2;

N31 is the refractive index with respect to the d-line of lens L31 of said third lens group G3;

N32 is the refractive index with respect to the d-line of lens L32 of said third lens group G3;

N33 is the refractive index with respect to the d-line of lens L33 of said third lens group G3;

ν21 is the Abbe number of lens L21 of said second lens group G2;

ν22 is the Abbe number of lens L22 of said second lens group G2;

ν23 is the Abbe number of lens L23 of said second lens group G2;

ν31 is the Abbe number of lens L31 of said third lens group G3;

ν32 is the Abbe number of lens L32 of said third lens group G3; and

ν33 is the Abbe number of lens L33 of said third lens group G32.

* * * * *